United States Patent [19]
Sato

[11] Patent Number: 4,563,082
[45] Date of Patent: * Jan. 7, 1986

[54] COPYING MACHINE WITH AUTOMATIC DOCUMENT FEEDER

[75] Inventor: Yukio Sato, Tokyo, Japan

[73] Assignee: Canon Kabushiki Kaisha, Tokyo, Japan

[*] Notice: The portion of the term of this patent subsequent to Jun. 26, 2001 has been disclaimed.

[21] Appl. No.: 624,291

[22] Filed: Jun. 25, 1984

Related U.S. Application Data

[63] Continuation of Ser. No. 320,706, Nov. 12, 1981.

[30] Foreign Application Priority Data

| Nov. 18, 1980 | [JP] | Japan | 55-161426 |
| Nov. 18, 1980 | [JP] | Japan | 55-161427 |
| Nov. 20, 1980 | [JP] | Japan | 55-162571 |
| Nov. 20, 1980 | [JP] | Japan | 55-162572 |
| Nov. 21, 1980 | [JP] | Japan | 55-163197 |
| Nov. 29, 1980 | [JP] | Japan | 55-167378 |
| Nov. 29, 1980 | [JP] | Japan | 55-167379 |

[51] Int. Cl.$^4$ ............................................. G03G 21/00
[52] U.S. Cl. ............................ 355/14 SH; 355/3 SH; 355/55
[58] Field of Search .............. 355/14 SH, 3 SH, 14 R, 355/55-57, 60, 8

[56] References Cited

U.S. PATENT DOCUMENTS

| 3,552,849 | 1/1971 | Limberger | 355/14 SH |
| 3,689,143 | 9/1972 | Case et al. | 355/8 X |
| 3,834,805 | 9/1974 | Pichierri | 355/14 SH |
| 4,170,414 | 10/1979 | Hubert et al. | 355/14 SH |
| 4,203,663 | 5/1980 | Ogura et al. | 355/3 SH |
| 4,281,919 | 8/1981 | Nomura et al. | 355/14 SH |
| 4,371,256 | 2/1983 | Yoshimura et al. | 355/14 SH |

Primary Examiner—R. L. Moses
Attorney, Agent, or Firm—Fitzpatrick, Cella, Harper & Scinto

[57] ABSTRACT

There is disclosed a copying machine with an automatic document feeder in which an original is held on a holding drum and a copy sheet is fed to a photosensitive drum in synchronism with the rotation of the holding drum.

The copying machine with an automatic document feeder has circulator for holding an original exposure, for exposing to light the original held on said circulator to form an image on a transfer material at an image-forming section, feeder for feeding the transfer material to said image-forming section, a generator for generating a reference signal in synchronism with rotation of said circulator, and a controller for controlling said feeder in response to said reference signal.

15 Claims, 33 Drawing Figures

COPYING MACHINE WITH AUTOMATIC DOCUMENT FEEDER

This is a continuation of application Ser. No. 320,706, filed Nov. 12, 1981.

BACKGROUND OF THE INVENTION

1. Field of the Invention

The present invention relates to a copying machine and, more particularly, to a copying machine with an automatic document feeder which exhausts an original in sheet form after passing it over an exposing part while holding it on a cylindrical holding drum.

2. Description of the Prior Art

Copying machines of higher speed and automated sequences are in more demand with the recent need for higher efficiency in office work. On the other hand, it is also desired that the copying machines and various other related equipment be simplified in construction.

Various automatic document feeders (ADF) are conventionally used for automatic feeding of an original. In particular, an automatic document feeder which is used in a mounted position on the copying machine from which an original press plate is removed requires more space and is heavier in weight. With a so-called circulation-type automatic document feeder, since the original is carried over a long distance several times, the original may become damaged and jamming tends to occur.

With a conventional copying machine with an automatic document feeder of the type described above, the feed timings of an original and a copy sheet are synchronized by, for example, counting drum clocks which are generated upon rotation of a photosensitive drum. Due to the reading error of pulses generated in response to the clock pulses, it is difficult to attain high precision in synchronizing the feed timings of the original and the copy sheet and to achieve a desired reliability.

SUMMARY OF THE INVENTION

It is an object of the present invention to provide a copying machine with an automatic document feeder which eliminates the drawbacks of the prior art copying machines with automatic document feeders, and which is compact in size, attains a high reliability, and is easy to operate.

It is another object of the present invention to provide a copying machine with an automatic document feeder in which an original is held on a holding drum and a copy sheet is fed to a photosensitive drum in synchronism with the rotation of the holding drum.

It is still another object of the present invention to provide a copying machine with an automatic document feeder wherein an original is held on a holding drum of a circumference smaller than the maximum length of the original to be copied, a copy sheet is fed to a photosensitive drum in synchronism with the rotation of the holding drum, the copy sheet is temporarily registered, and the registering is released in synchronism with the rotation of the holding drum for feeding the copy sheet to the photosensitive drum.

It is still another object of the present invention to provide a copying machine with an automatic document feeder wherein an original is held on a holding drum of a circumference smaller than the maximum length of the original to be copied, a descrimination is made as to whether or not the original is longer than the circumference of the holding drum, so that a copying operation may be performed according to the length of each original to be copied.

It is still another object of the present invention to provide a copying machine with an automatic document feeder which is capable of attaining proper timings of control of various parts even if the rotational frequency of a holding drum or a photosensitive drum is varied for copying in different scales.

It is still another object of the present invention to provide a copying machine with an automatic document feeder which prevents jamming in advance to thereby prevent damage to the original.

The above and other objects and features of the present invention will become apparent from the following description when taken in conjunction with the accompanying drawings.

DETAILED DESCRIPTION OF THE PREFERRED EMBODIMENTS

The present invention will now be described in more detail with reference to the accompanying drawings.

Figure 1:
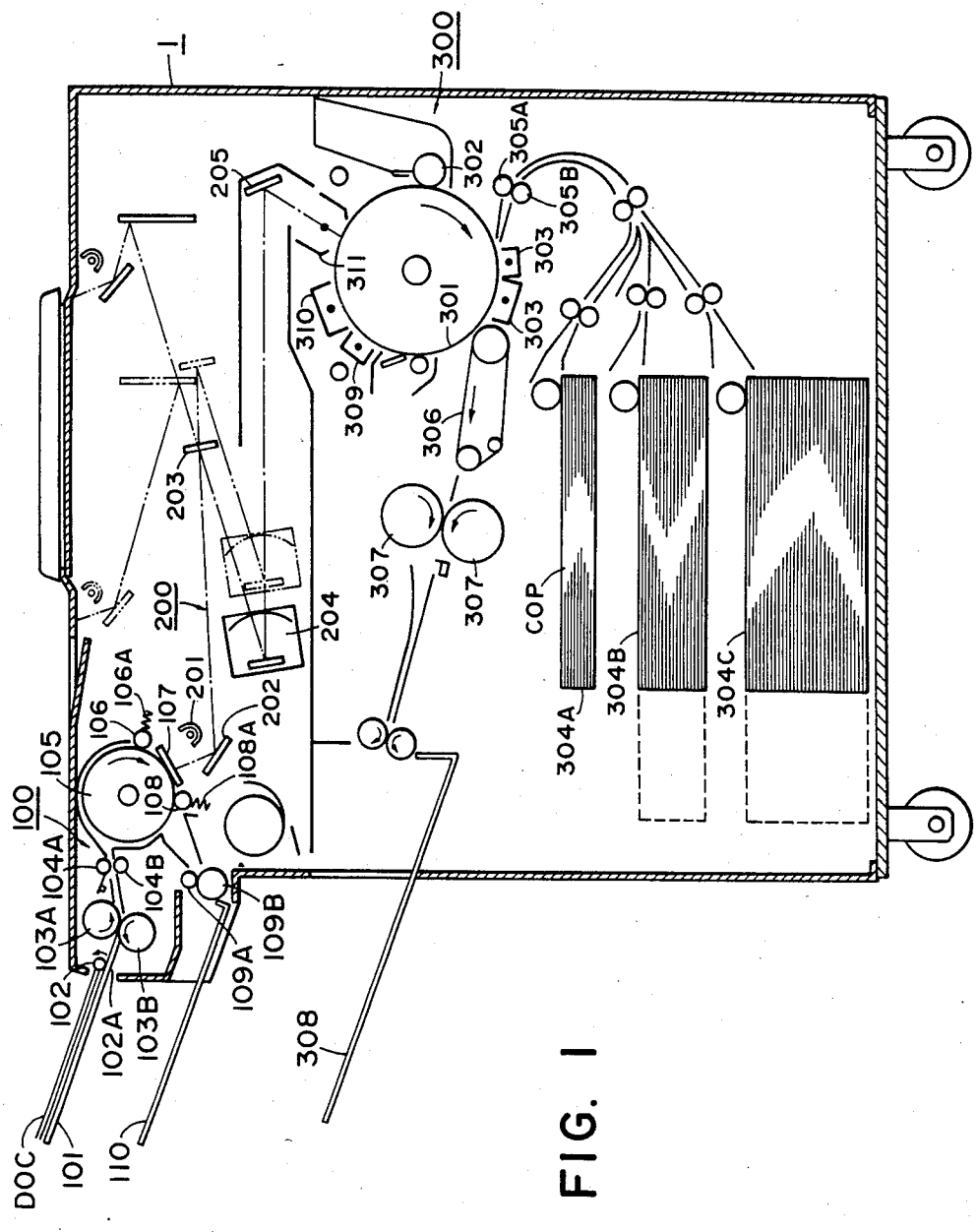
FIG. 1 shows the construction of a copying machine according to an example of the present invention.

FIG. 1 shows an embodiment of a copying machine with an automatic document feeder. A copying machine 1 has, at its upper part, an automatic document feeder (to be referred to a an ADF hereinafter) 100 and an optical system 200 and, at its lower part, a copier 300.

A plurality of originals DOC may be placed on a table 101. A feed roller 102 is displaced upward in advance by a plunger (not shown), and the originals DOC are placed in an opening defined by the roller 102 and a bottom plate 102A. One original DOC is fed toward an original holding drum 105 by rotating the feed roller 102 and separation rollers 103A and 103B. Register rollers 104A and 104B interrupt the feeding operation of the original DOC for a predetermined period of time. The original DOC fed on the original holding drum 105 is displaced therealong by a rubber roller 106 or the like which is biased against the drum 105 by a spring 106A. The original DOC is then exposed to light from an exposure lamp 201 at an exposing section 107. Upon this operation, an electrostatic latent image of the information on the original DOC is formed on the surface of a photosensitive drum 301 of the copier 300 through sheet mirrors 202 and 203, an inner mirror lens 204, and a sheet mirror 205. The exposed original DOC is displaced toward an exhaust tray 110 through a rubber roller 108 and exhaust rollers 109A and 109B. As in the case of the rubber roller 106, the rubber roller 108 is urged against the drum 105 by a spring 108A, so that the leading end of a first original DOC1 separated from the drum may not interfere with the exposure of the trailing part of the original DOC1 at the exposing section 107. The peripheral speeds of the exhaust rollers 109A and 109B are set to be slightly smaller than the peripheral speed of the drum 105, so that a pulling force may not be exerted on the original DOC by the exhaust rollers 109A and 109B due to a difference between the feeding speed of the original DOC by the drum 105 and the feeding speed of the original DOC by the exhaust rollers 109A and 109B. In this manner, even if the exhausting section and the exposing section are close to each other, the automatic document feeder may be made compact in size without causing adverse effects on the exposure of the original DOC at the exposing section. In the copying machine shown in FIG. 1, the circumference of the original holding drum 105 is set to be smaller than the maximum length of the original which may be copied.

An electrostatic latent image formed on the photosensitive drum 301 is visualized by a developing unit 302. The visualized image is then transferred, at a transfer unit 303, to a copy sheet COP fed to the photosensitive drum 301 from a sheet feed section 304A through register rollers 305A and 305B. The copy sheet is fed from the sheet feed section 304A to the register rollers 305A and 305B by a transfer sheet feed unit of known construction. The timing at which the copy sheet begins to be fed is determined by a copy sheet feed timing signal to be described hereinafter. The register rollers 305A and 305B are driven in synchronism with the feeding operation of the original DOC. The copy sheet COP is conveyed through a conveyor belt 306 and a fixing roller 307 for fixing the image thereon, and is then output to a tray 308. Chargers 309, 310, and 311 control the potential at the surface of the photosensitive drum 301.

Figure 2:
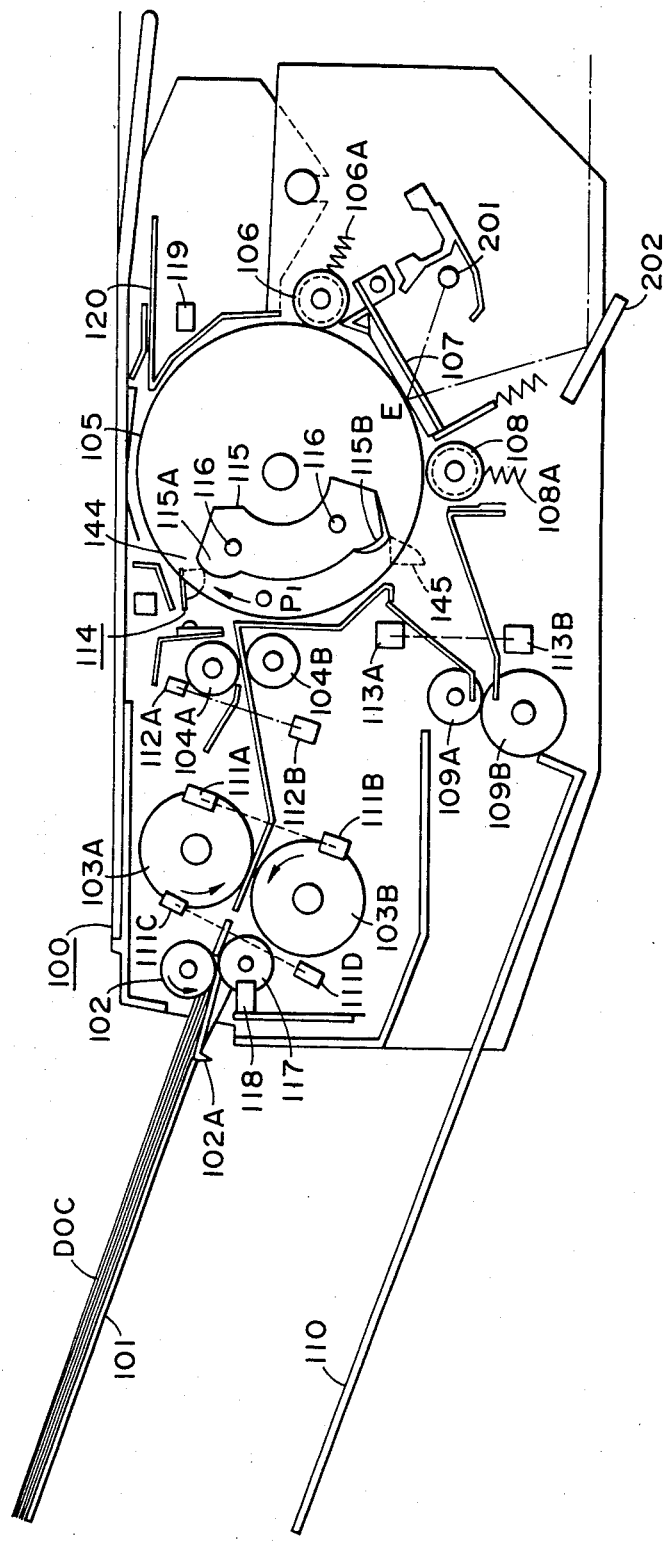
FIG. 2 shows the construction of an example of the automatic document feeder according to the present invention.

FIG. 2 shows the details of the ADF 100. Size sensors 111A and 111B sense the size of the original DOC. Pairs of ramp sensors 111C and 111D are arranged at side edges of the original and sense a slanted orientation of the original DOC. Original detectors 112A and 112B detect the original DOC. Sheet feed sensors 113A and 113B sense if the original DOC has been fed. A gripper 114 is mounted on the surface of the original holding drum 105. As shown in detail in FIG. 3, the gripper 114 includes a press plate 141 mounted to be pivotal about a shaft 142. The press plate 141 is constantly urged by a torsion spring 143 toward an original press member 105A arranged on the original holding drum 105. The gripper 114 has, at the lower surface of the press plate 141, a top 144 and a separation lever 145 separated from the top 144 by a predetermined distance.

Figure 3:
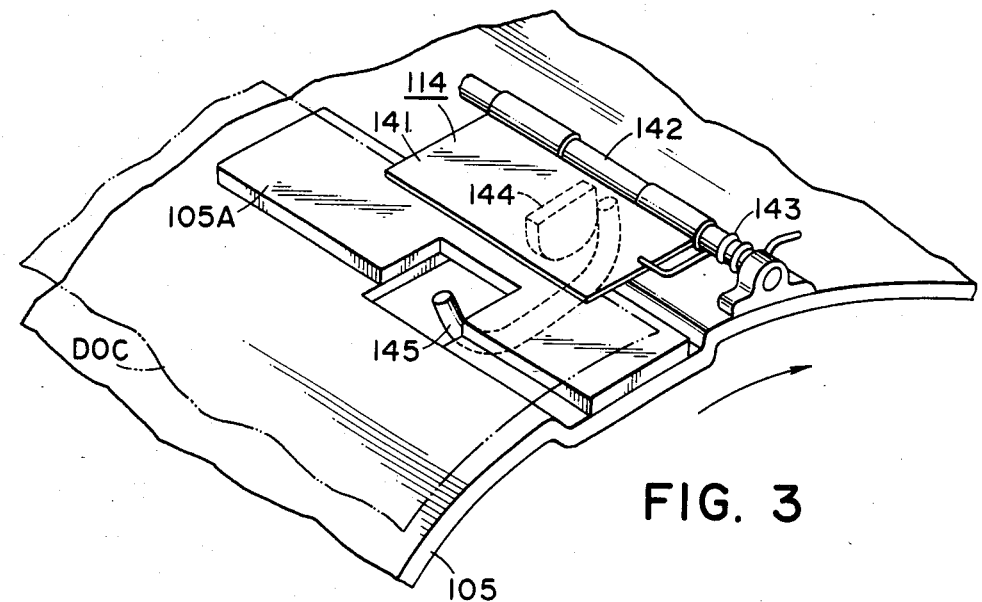
FIG. 3 is an enlarged perspective view showing an example of a gripper of the feeder shown in FIG. 2.

Referring to FIGS. 2 and 3, a cam 115 is slidably mounted on sliding shafts 116 extending in the axial direction of the drum 105. A cam sliding plunger (not shown) is driven as needed to slide the cam 115 to a position to oppose the top 144 of the gripper 114 and the separation lever 145. When the drum 105 rotates under this condition and the gripper 114 opposes the cam 115, the top 144 is pressed upward by the cam 115, defining an opening between the press plate 141 and the original press member 105A. The size of this opening becomes maximum when the gripper 114 opposes an upper end 115A of the cam 115. When the drum 105 rotates further after the original DOC is fed, the top 144 is separated from the cam 115 and the original DOC is clamped between the press plate 141 and the original press member 105A. When the drum 105 clamping the original DOC further rotates and the gripper 114 opposes a lower end 115B of the cam 115, the top 144 and the separation lever 145 are pressed upward by the cam 115 and the original DOC is released from the drum 105. The original DOC is easily released from the drum 105 by the separation lever 145.

A disk 117 with a circumferential slit is rotated by the last original DOC of the originals placed on the table 101, and generates, by a photointerrupter 118, a last paper detection signal signalling the feeding of the last original DOC. A grip failure sensor 119 senses the passage of an original which fails to be clamped by the gripper 114 through an exhaust path 120.

Figure 4:
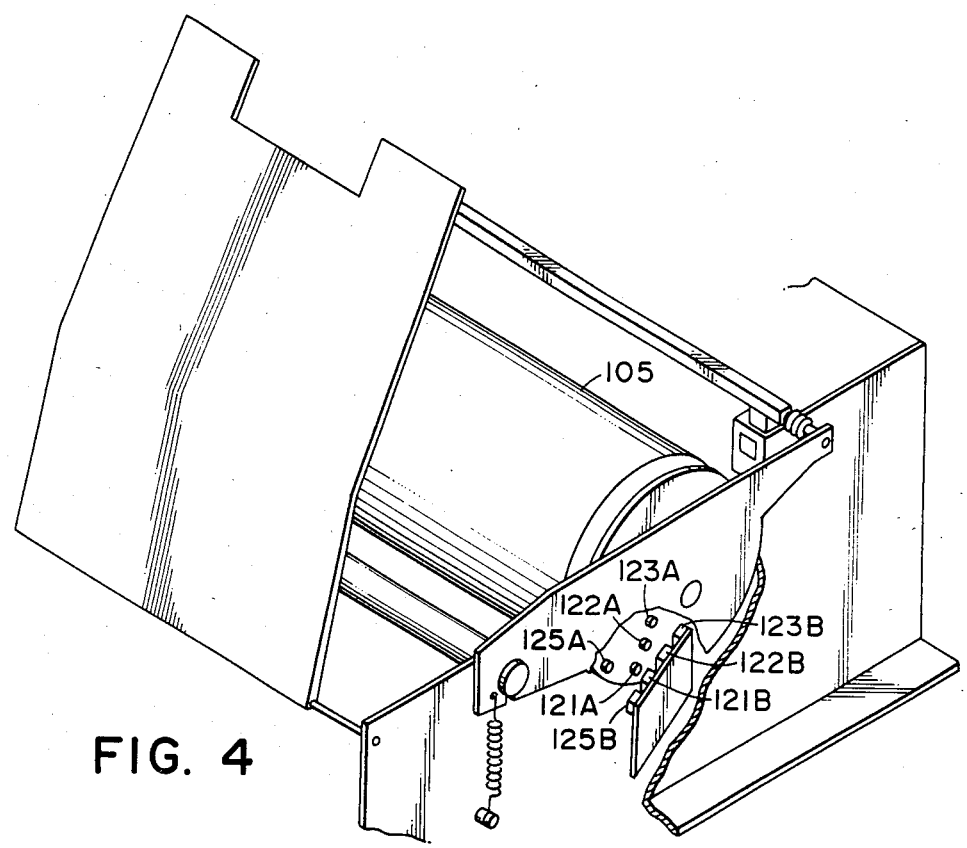
FIG. 4 is a perspective view showing sensors in the feeder shown in FIG. 2.

FIG. 4 shows a signal generating means for generating a reference signal and a copy sheet feed timing signal upon each complete revolution of the original holding drum 105. Hall ICs 121A to 123A as sheet feed sensors are fixed to one end face of the drum 105. Magnets 121B to 123B are fixed to a side wall 124 of the ADF and oppose the sheet feed sensors 121A to 123A to generate the reference signal. In this embodiment, the respective parts are controlled based on this reference signal. Three pairs each of the sheet feed sensors 121A to 123A and the magnets 121B to 123B are included to generate the reference signal consistently at a desired period when the relative speed between the original holding drum 105 and the photosensitive drum 301 is changed for enlarged or reduced scale copying operation. A Hall IC 125A as a register release sensor synchronizes the feeding operations of the original DOC and the copy sheet COP registered by the register rollers 305A and 305B (FIG. 1). A magnet 125B is mounted to the side wall 124 of the ADF. For copying in different scales, a plurality of the Hall ICs 125A and the magnets 125B need merely be incorporated.

Figure 5:
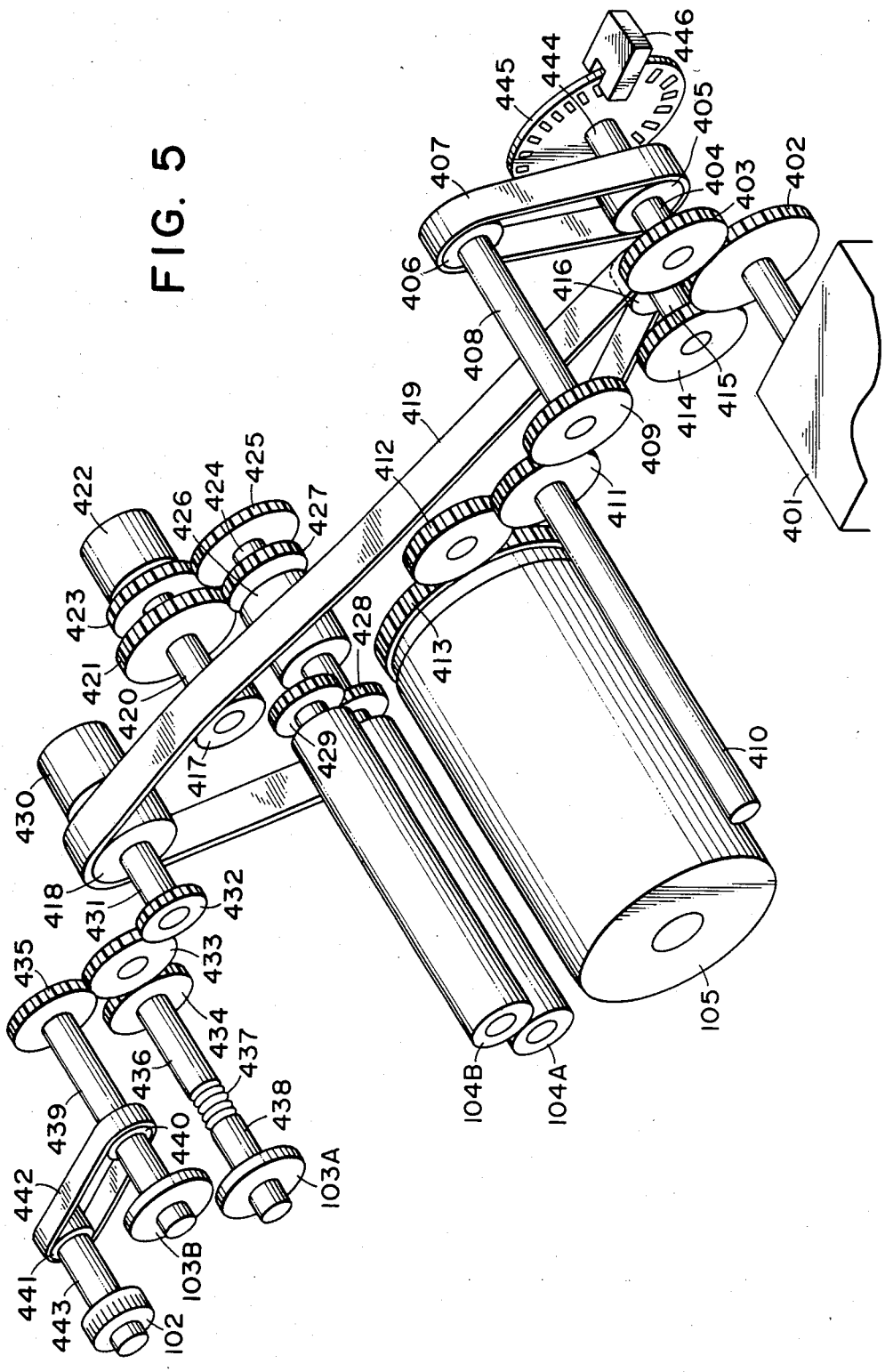
FIG. 5 is a perspective view showing an example of a power transmission device of the automatic document feeder.

The power transmission mechanism of the ADF will now be described. FIG. 5 shows an example of the power transmission mechanism. A speed switch section 401 has three kinds of electromagnetic clutches. Rotational power is transmitted from a main motor (not shown) to the speed switch section 401 which provides three rotational frequencies according to whether copying is in the same scale or in one of two different reduced scales. The output of the speed switch section 401 is transmitted to a gear 403 through a gear 402. The gear 403 is fixed to one end of a shaft 404, to the other end of which is fixed a timing pulley 405. A timing belt 407 is mounted between the timing pulley 405 and a timing pulley 406 to transmit the rotation of the gear 403 to the pulley 406 through the pulley 405 and the belt 407. Since the pulley 406 is fixed to one end of a shaft 408, to the other end of which is fixed a gear 409, the gear 409 rotates at the same speed as the pulley 406. The gear 409 meshes with a gear 411 fixed to one end of a shaft 410. The gear 411 also meshes with a gear 412 which in turn meshes with a gear 413 formed at one end of the original holding drum 105. The rotation of the gear 409 is thus transmitted to the drum 105. Since the rotational frequency obtained from the speed switch section 401 is transmitted to the original holding drum 105 at a predetermined reduction ratio, the drum 105 rotates at a rotational frequency corresponding to a desired copying mode, for example, for copying information on an original of A3 size on a copy sheet of A4 size in a reduced scale.

The gear 402 at the output end of the speed switch section 401 also meshes with a gear 414, so that the output of the speed switch section 401 may also be transmitted to the gear 414. A timing pulley 416 is fixed to one end of a shaft 415, to the other end of which is fixed the gear 414. A timing belt 419 is mounted on timing pulleys 416, 417 and 418. Therefore, the output of the speed switch section 401 is transmitted to the pulleys 417 and 418 through the gears 402 and 414, the pulley 416 and the timing belt 419.

The timing pulley 417 is fixed to one end of a shaft 420. A gear 421 for double speed is fixed to the central part of the shaft 420, and to the other end of the shaft is keyed an electromagnetic clutch 422 for equal speed. A gear 423 is fixed to the clutch 422. While the clutch 422 is off, the shaft 420 and the gear 423 are free to rotate relative to each other. A shaft 424 projects from one end of the register roller 104A, and a gear 425 for equal speed is fixed to the shaft 424. An electromagnetic clutch 426 for double speed is keyed to the shaft 424, and a gear 427 is fixed to the clutch 426. When the clutch 426 is off, the shaft 424 and the gear 427 are free to rotate relative to each other. The register rollers 104A and 104B are connected through gears 428 and 429 so that the rotation of the shaft 424 is transmitted to the register roller 104B. When the clutch 422 is energized, the rotation of the shaft 420 is transmitted to the register roller 104A through the gears 423 and 425, and the shaft 424 and the register rollers 104A and 104B rotate at equal speed (equal to the peripheral speed of the drum 105). When the clutch 422 is deenergized and the clutch 426 is energized, the rotation of the shaft 420 is transmitted to the register roller 104A through the gears 421 and 427 and the shaft 424, and the rollers 104A and 104B rotate at double the peripheral speed of the drum 105.

The timing pulley 418 around which is mounted the timing belt 419 is fixed to an electromagnetic clutch 430 to connect the pulley 418 with a shaft 431 and a gear 432 fixed to the end of the shaft 431. Therefore, when the clutch 430 is off, the rotation of the pulley 418 is not transmitted to the gear 432. The gear 432 is connected to gears 434 and 435 through an idle gear 433. The gear 434 is fixed to one end of a rotating shaft 436, to the other end of which is connected one end of a rotating shaft 438 through a flexible coupling 437. The separation roller 103A is fixed to the other end of the rotating shaft 438. The gear 435 is fixed to one end of a shaft 439, to the other end of which is fixed the separation roller 103B and to the central part of which is fixed a timing pulley 440. A timing belt 442 is wound around the pulley 440 and pulley 441 to transmit the rotation of the shaft 439 to the pulley 441. The pulley 441 is fixed to one end of a shaft 443, to the other end of which is fixed the feed roller 102. Therefore, the feed roller 102 rotates with the pulley 441. When the electromagnetic clutch 430 is turned on, the separation rollers 103A and 103B and the feed roller 102 rotate.

The separation rollers 103A and 103B are not in contact with each other, and the distance between the axes of these rollers can be controlled to facilitate the separation of the original. Since the rotating center of the separation roller 103A and the rotating center of the gear 434 cannot be made coaxial, the two rotating shafts 436 and 438 are coupled through the flexible coupling 437.

One end of a shaft 444 is fixed to one side surface of the timing pulley 405. A disk 445 with slits at its periphery is fixed to the other end of the shaft 444. A photointerrupter 446 is arranged to straddle at a distance part of the periphery of the disk 445. The disk 445 and the photointerrupter 446 generate clock signals with the rotation of the original holding drum 105.

Figure 6:
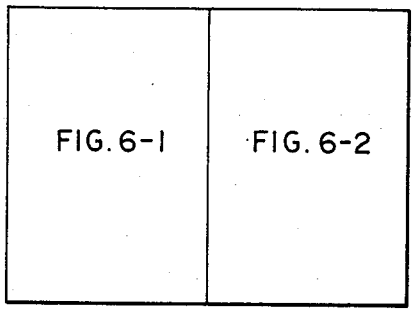
FIG. 6 is a diagram indicating the relationship between FIG. 6-1 and FIG. 6-2, which in turn provide, in combination, a block diagram showing an example of a control device of the copying machine according to the present invention.

FIG. 6 shows an example of a control unit according to the present invention. A central processing unit CPU has counters CNT1 to CNT8 and so on and includes as its main part a known one-chip microcomputer (e.g., $\mu$PD545 by NEC) incorporating ROMs and RAMs. The CPU receives signals from the respective sensors and the clock signals generated upon the rotation of the original holding drum 105 and controls the respective units of the copying machine. The counters CNT1 to CNT8 count periods of times N1 to N8 to be described hereinafter. An AND gate G1 synchronizes the feeding operation of the copy sheet COP registered by the register rollers 305A and 305B (FIG. 1) and the feeding operation of the original DOC fed to the original holding drum 105. A time T1 drives the register rollers 305A and 305B for a predetermined period of time corresponding to the size of the copy sheet COP. Drivers DRV1, DRV5 to DRV7, DRV10, DRV15 and DVRP control the respective units of the copying machine according to the respective control signals output from the central processing unit CPU. A drum clock generator CLD supplies to the central processing unit CPU through a buffer BUF clock signals generated from the disk 445 and the photointerrupter 446. A copy sheet feed timing generator DTG is also included in the CPU.

Figure 7:
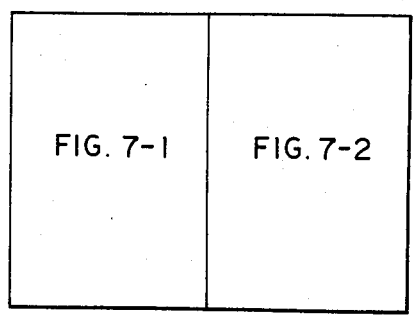
FIG. 7 is a diagram indicating the relationship between FIG. 7-1 and FIG. 7-2 which in turn provide, in combination timing charts of control signals for the respective units shown in FIGS. 1 to 4 for copying an original of A4 size with a copy sheet of A4 size.
Figure 8:
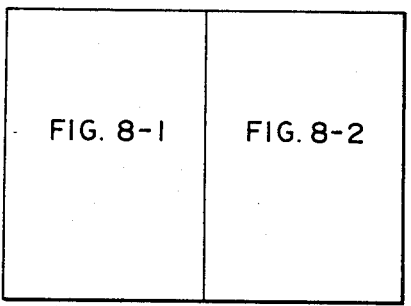
FIG. 8 is a diagram indicating the relationship between FIG. 8-1 and FIG. 8-2 which in turn provide, in combination, timing charts of control signals for the respective units shown in FIGS. 1 to 6 for copying an original of A4 size with a copy sheet of A3 size.

FIG. 7 shows the respective control signals and the timing signals for copying the information of an original of A4 size on a copy sheet of A4 size. FIG. 8 shows the respective control signals and the timing signals for copying the information of an original of A4 size on a copy sheet of A3 size. FIGS. 9A to 9E are flow charts showing the mode of operation of the copying machine according to the present invention. The mode of operation of the copying machine with an automatic document feeder of the present invention will therefore be described in more detail with reference to FIGS. 9A to 9E. In the following description, a case will first be described for copying the information of three originals of A4 size on copy sheets of A4 size, respectively, and a case will then be described for copying the information of two originals of A4 size on copy sheets of A3 size, respectively.

Three originals of A4 size are placed on the table 101, and a cassette holding copy sheets of A4 size is mounted to the sheet feed section 304A. When a print button PTB (FIG. 6) of the copying machine 1 is depressed (step T1 in FIG. 9; the following steps are also shown in FIG. 9, although it will not be indicated hereinafter), a reference signal S1 rises in amplitude, upon which the photosensitive drum 301 starts rotating and preparation for the copying operation is performed. In step T2, it is discriminated if the length of the copy sheet is longer than the circumference of the drum 105. Since the copy sheet of A4 size is mounted in this case, the program advances according to the flow following NO. Simultaneously with the rotation of the photosensitive drum 301, the original holding drum 105 also starts rotating at a speed v. When the feed sensor 121A opposes the magnet 121B as a result of the rotation of the drum 105, the reference signal S4 rises. After a period of time N1 from the leading edge of the reference signal S4, the copy sheet feed timing signal S3 rises by the copy sheet feed timing signal generator DTG incorporated in the central processing unit CPU (step T3), to feed a copy sheet COP1 from the sheet feed section 304A. At the same time, a cam control signal S10 rises (step T3) to slide the cam 115 so that the cam 115 may oppose the gripper 114.

After a period of time N2 from the leading edge of the signal S3, the signal S3 falls (step T4) and a feed signal S5 as a drive signal for the feed roller 102 and the separation rollers 103A and 103B rises (step T5) to drive the feed roller 102 and the separation rollers 103A and 103B counterclockwise at the speed v. Then, the first (uppermost) original DOC1 of the originals DOC placed on the table 101 is separated from a second (underlying) original DOC2 below the original DOC1, and is fed to the register rollers 104A and 104B. When the leading end of the original DOC1 sequentially passes the sensors 111A and 111B, and the detectors 112A and 112B, original detection signals S8 and S9 rise. In this embodiment, immediately before the signal S9 rises, that is, immediately before the leading end of the original DOC1 reaches the detectors 112A and 112B, the Hall IC 121A mounted on the end face of the drum 105 opposes the magnet 121B again. As a result of this, a second pulse of the reference signal S4 rises, and the period of time N1 is counted from this leading edge (step T6). Even if the leading end of the original DOC1 reaches the register rollers 104A and 104B after passing between the detectors 112A and 112B. Therefore, the original DOC1 forms a loop (wandering) upstream of the rollers 104A and 104B and waits.

After a period of time N4 from the leading edge of the copy sheet feed timing signal S3, register roller drive signals S6 (multi) and S7 (equal) rise (step T7) to rotate the rollers 104A and 104B and to feed the original DOC1 at a speed 2V, which is twice the speed of the drum 105, toward the gripper 114 of the drum 105. At this time, the gripper 114 is at a position P1 (FIG. 2) where it is open and rotating clockwise at the speed V. Since the signal S6 for feeding the original DOC1 at the speed 2V is at the peak for a period of time N5, the original DOC1 follows the gripper 114 at the speed 2V for the period of time N5. When the original DOC1 catches up with the gripper 114 and forms a loop of several millimeters, the top 144 of the gripper 114 is separated from the cam 115 so that the original DOC1 is clamped between press plate 141 and the original press member 105A. The register roller drive signal S6 then falls (step T8) to feed the original DOC1 at the same speed as the peripheral speed V of the original holding drum 105. The original DOC1 thus does not form an excess loop.

After the period of time N5 from the leading edge of the register roller drive signal S6, a cam control signal S10 falls (step T8) to slide the cam 115 so that the cam 115 and the top 144 of the gripper 114 may not oppose each other. While the counter CNT6 energized in response to the trailing edge of the signal S10 counts the period of time N6, it is discriminated if the trailing end of the original DOC1 passes between the sensors 111A and 111B, that is, if the signal S8 is at the base line (step T9). In this embodiment, since the original of A4 size is used and the signal S8 rises while counting the period of time N6, a trailing end passage flag is generated (T10). When the counter CNT6 finishes counting the period of time N6, the central processing unit CPU controls a register roller gate signal S14 to rise (T11). The signal S14 is supplied to the AND gate G1 (FIG. 6). In step T12, it is discriminated that the trailing end passage flag is generated. In step T13, the cam control signal S10 rises again so that the cam 115 may oppose the gripper 114. The original DOC1 is separated from the drum 105 and the original DOC2 is held on the original holding drum 105. In the case of copying the original of A4 size, the second original DOC2 begins to be fed when the trailing end of the first original DOC1 passes between the sensors 111A and 111B. At this time, the original DOC1 is fed at the speed V by the register rollers 104A and 104B. Since the original DOC2 is being supplied at the speed v (where V>v) by the separation rollers 103A and 103B, the trailing end of the original DOC1 and the leading end of the original DOC2 separate from each other as time passes. In this manner, the size of the original may be discriminated by the sensors 111A and 111B. If it is discriminated in step T12 that the trailing end passage flag is not present, an error is discriminated and the copying operation is interrupted since the original DOC is of A3 size.

After the period of time N1 from the leading edge of the second pulse of the reference signal S4, the copy sheet feed timing signal S3 rises (step T14) to feed a second copy sheet COP2 to the register rollers 305A and 305B and to start counting the periods of time N3 and N8 (step T15). When the trailing end of the first original DOC1 passes between the detectors 112A and 112B, the signal S9 rises and a period of time N7 begins to be counted (step T16). After the period of time N7 has elapsed, the register roller drive signal S7 rises (T17) to stop the register roller 104B and the feed roller drive signal S5 falls (step T17) to stop the rollers 102, 103A and 103B. Then, the leading end of the original DOC2 temporarily stops immediately before it reaches the sensors 111A and 111B.

The original DOC1 clamped by the gripper 114 is rotated by the drum 105. The loop of the original DOC1 is eliminated by the rubber roller 106 which is urged against the drum 105, and the original DOC1 advances to the exposing section 107 as held by the drum 105. When passing the exposing section 107, the original DOC1 is exposed by the exposure lamp 201. Thus, the information on the original DOC1 is written as an electrostatic latent image on the surface of the photosensitive drum 301 through the optical system 200. This electrostatic latent image is visualized by the developing unit 302, and is transferred onto the copy sheet COP1 by the transfer unit 303. The copy sheet COP1 is conveyed by the conveyor belt 306 and the fixing roller 307 and is output to the exhaust tray 308.

The synchronization of the feeding operation of the original DOC1 and the copy sheet COP1 registered by the register rollers 305A and 305B will now be described. As has been described, the Hall IC 125A as a register release sensor is mounted to one end face of the original holding drum 105, and the magnet 125B is mounted to the side wall 124 of the ADF. Therefore, a register release signal S13 is generated upon every complete revolution of the drum 105. The signal S13 and the register roller gate signal S14 are supplied to the AND gate G1. The output of the AND gate G1 is supplied to the timer T1. In response to the register release signal S13 which is generated when the register roller gate signal S14 is at high level, the output of the AND gate G1 becomes high level and the timer T1 is energized. Then, a register roller drive signal S15 for driving the register rollers 305A and 305B rises for a predetermined period of time which is set by the timer T1, and the original DOC1 is fed to the photosensitive drum 301. The timing of the release of the registering of the copy sheet COP1 is such that the copy sheet COP1 fed from the register rollers 305A and 305B reaches the transfer unit 303 at the same time that the visualized image formed on the surface of the photosensitive drum 301 reaches the transfer unit 303. This may be easily attained by suitably determining the mounting positions of the register release sensor 125A and the magnet 125B relative to the gripper 114 for generating the register release signal S13. In this manner, in synchronism with the rotation of the original holding drum 105 of the ADF 100, the registering of the copy sheet COP1 by the register rollers 305A and 305B is released. Therefore, a problem with the conventional method may be solved in which the timing at which the registering of the copy sheet is released is obtained by counting the clock pulses, that is, the feeding of the copy sheet is nonsynchronized due to readout error of the clock pulses or the like.

The flow of operation according to the present invention will further be described with reference to FIGS. 7 and 9A to 9E. When the period of time N3 elapses after the leading edge of the second pulse of the copy sheet feed timing signal S3, the signal S3 falls (step T18 in FIG. 9B), and the feed roller drive signal S5 rises (step T19) to drive the rollers 102, 103A and 103B for feeding the original DOC2. During the period of time N8 from the leading edge of the second signal S3, the Hall IC 121A opposes the magnet 121B and the third pulse of the reference signal S4 rises to start counting the period of time N1 (step T20). Then, the leading end of the original DOC2 reaches the detectors 112A and 112B and the signal S9 rises. When the period of time N8 elapses, the register roller drive signals S6 and S7 rise (step T21) to feed the second original DOC2 at the speed 2V toward the gripper 114. As has been described, when the period of time N5 elapses, the signals S6 and S10 fall (step T22) to hold the original DOC2 on the drum 105. The period of time N6 is counted from the trailing edge of the signal S10 (step T23). The trailing end of the original DOC2 passes between the sensors 111A and 111B during this period, and a third original DOC3 begins to be fed immediately before this. After the elapse of the period of time N6, it is discriminated in step T24 if the trailing end passage flag is generated. In step T25, the signal S10 is generated. After the counting of the period of time N1 is completed, the third copy sheet feed timing signal S3 is generated (step T26) to feed a third copy sheet COP3 toward the register rollers 305A and 305B. In response to the signal S3, the periods of time N3 and N8 begin to be counted (step T27).

When the period of time N7 elapses after the trailing end of the original DOC2 passes between the detectors 112A and 112B, the feed roller drive signal S5 and the register roller drive signal S7 fall (step T28) to interrupt the rollers 102, 103A, 103B and 104B. Consequently, the original DOC3 is temporarily stopped. After the elapse of the period of time N3, the signal S3 falls (step T29 in FIG. 9B) and thereafter the feed roller drive signal S5 rises (step T30) to start feeding the original DOC3. In this embodiment, the original DOC3 is the last original and rotates the disk 117 shown in FIG. 2. Therefore, the photointerrupter 118 generates a last paper detection signal S12, and an end flag is generated in step T31. With this end flag, the feeding of extra copy sheets is prevented. In this embodiment, the number of copy sheets to be copied is not input in advance. Therefore, it is necessary to detect the last original as early as possible. However, in the case of this embodiment, it is possible to detect the last original with the disk 117 and the photointerrupter 118 at a sufficiently early time.

After the elapse of the period of time N8 from the leading edge of the third pulse of the copy sheet feed timing signal S3, the register roller drive signals S6 and S7 rise (step T32 in FIG. 8A) to drive the register rollers 104A and 104B and to feed the original DOC3 at the speed 2V toward the gripper 114. After the elapse of the period of time N5, the feeding speed of the original DOC3 is held at speed V (step T23), and the original DOC3 clamped between the press plate 141 and the original press member 105A is rotated by the drum 105. Then, in a similar manner as described above, steps T34, T35 and T36 are executed. After the cam control signal S10 rises and after the elapse of the period of time N1 from the leading edge of the fourth pulse of the reference signal S4, it is discriminated in step T37 if the end flag is generated, and counting of the periods of time N3 and N8 is initiated without the signal S3 (step T38) rising. After the elapse of the period of time N7 from the arrival of the trailing end of the original DOC3 at the detectors 112A and 112B, the feed roller drive signal S5 and the register roller drive signal S7 fall (step T39) to stop the rollers 102, 103A, 103B and 104B. After the elapse of the period of time N3, it is discriminated in step T40 if the end flag is generated. After the elapse of a period (N1+N8+N5) from the trailing edge of the fourth pulse of the reference signal S4, the signals S10 and S14 fall (step T41) to complete the process of copying the information of the original of A4 size on the copy sheet of A4 size.

Figure 9A:
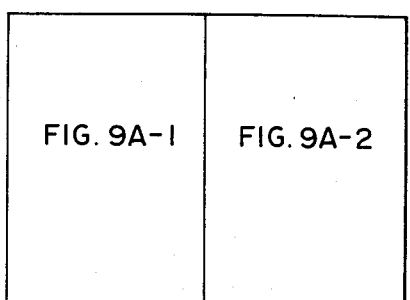
FIGS. 9A to 9E are flow charts showing an example of operating steps according to the present invention.
Figure 9C:
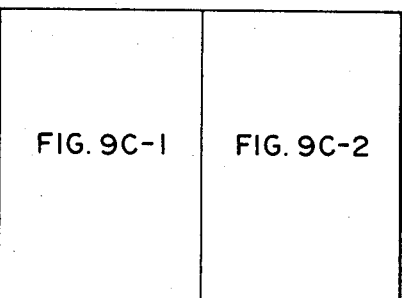

A case will now be considered with reference to FIGS. 8 and 9A and 9C, wherein two originals of A4 size are copied on copy sheets of A3 size. Two A4 size originals are placed on the table 101 and the cassette holding the A3 size copy sheets is mounted to the sheet feed section 304C.

When the print button PTB is depressed (step T1), the signal S1 rises, upon which the photosensitive drum 301 starts rotating and the preparation for the copying operation is performed. In step T2, it is discriminated if the size of the copy sheet is greater than the circumference of the drum 105. In this embodiment, the copy sheet of A3 size is mounted, and the operation is performed according to the flow following YES, that is, the flow shown in FIG. 9C. When the first pulse of the reference signal S4 is generated upon the rotation of the holding drum 105, the counter CNT1 starts counting the period of time N1 (step T101). After the period of time N1 is counted, the copy sheet feed timing signal S3 is generated (step T102) to feed the copy sheet COP1 of A3 size from the sheet feed section 304A to the register rollers 305A and 305B. The cam control signal S10 also rises at this moment (step T102). In response to the leading edge of the signal S3, the counters CNT2 and CNT4 are energized to start counting the periods of time N2 and N4. After the elapse of the period of time N2, the signal S3 falls, and the feed roller drive signal S5 rises (step T103) to feed the A4 size original placed on the table 101 to the register rollers 104A and 104B. While the counter CNT4 counts the period of time N4, the leading end of the original DOC1 sequentially reaches the sensors 111A and 111B and the detectors 112A and 112B, and the signals S8 and S9 rise. Then, the second pulse of the reference signal S4 rises and the counting of the period of time N1 is initiated again (step T104). After the period of time N4 elapses, the register roller drive signals S6 and S7 rise (step T105) to drive the register rollers 104A and 104B and to feed the original DOC1 registered by the register rollers 104A and 104B at the speed 2V for the period of time N4 toward the original holding drum 105. Then, the leading end of the original DOC1 is clamped by the gripper 114 of the original holding drum 105. Thereafter, the original DOC1 rotates at the speed V together with the drum 105 (step T106). When the leading end of the original DOC1 reaches the exposing section 107, exposure is initiated and the exposure is terminated at least after the trailing end of the original passes the exposing section 107. As will be described hereinafter, in this embodiment, the original DOC1 rotates twice while clamped by the holding drum 105, but is exposed only at the first rotation. In response to the trailing edge of the cam control signal S10, the counter CNT6 is energized to start counting the period of time N6. While the period of time N6 is counted, it is discriminated if the trailing end of the original DOC1 passes between the sensors 111A and 111B, that is, if the original detection signal S8 falls (step T107). The flow up to step T107 is the same as in the case of the original of A4 size.

Figure 10:
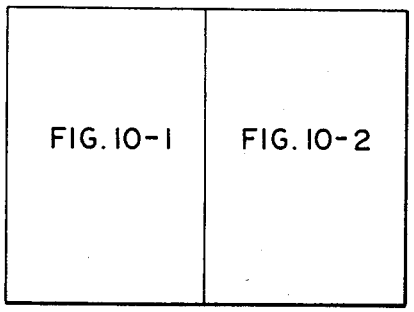
FIG. 10 is a diagram indicating the relationship between FIG. 10-1 and FIG. 10-2, which in turn provide, in combination, timing charts of control signals for the respective units shown in FIGS. 1 to 6 for copying an original of A3 size with a copy sheet of A3 size.
Figures 1, 6:
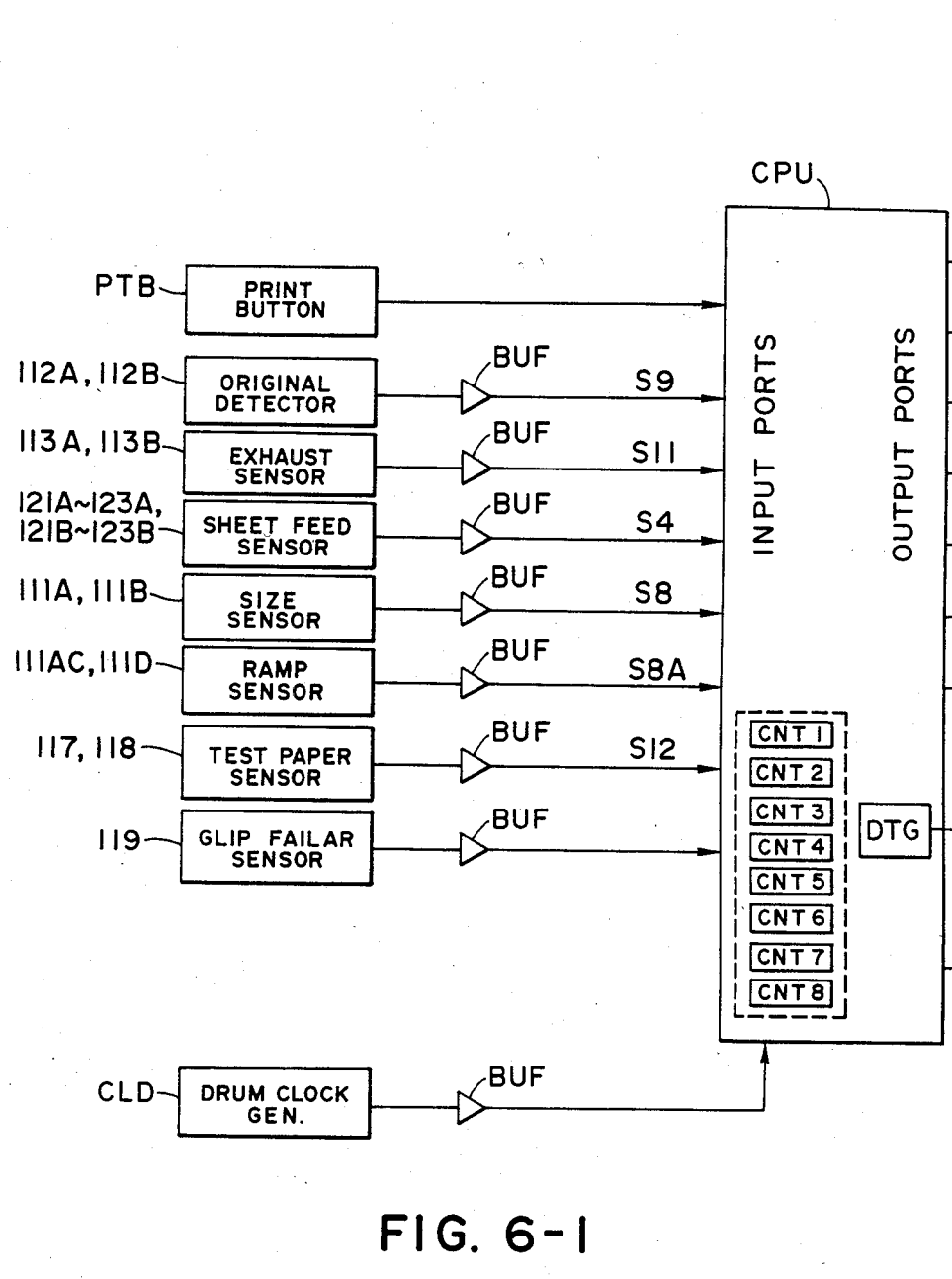
Figures 2, 6:
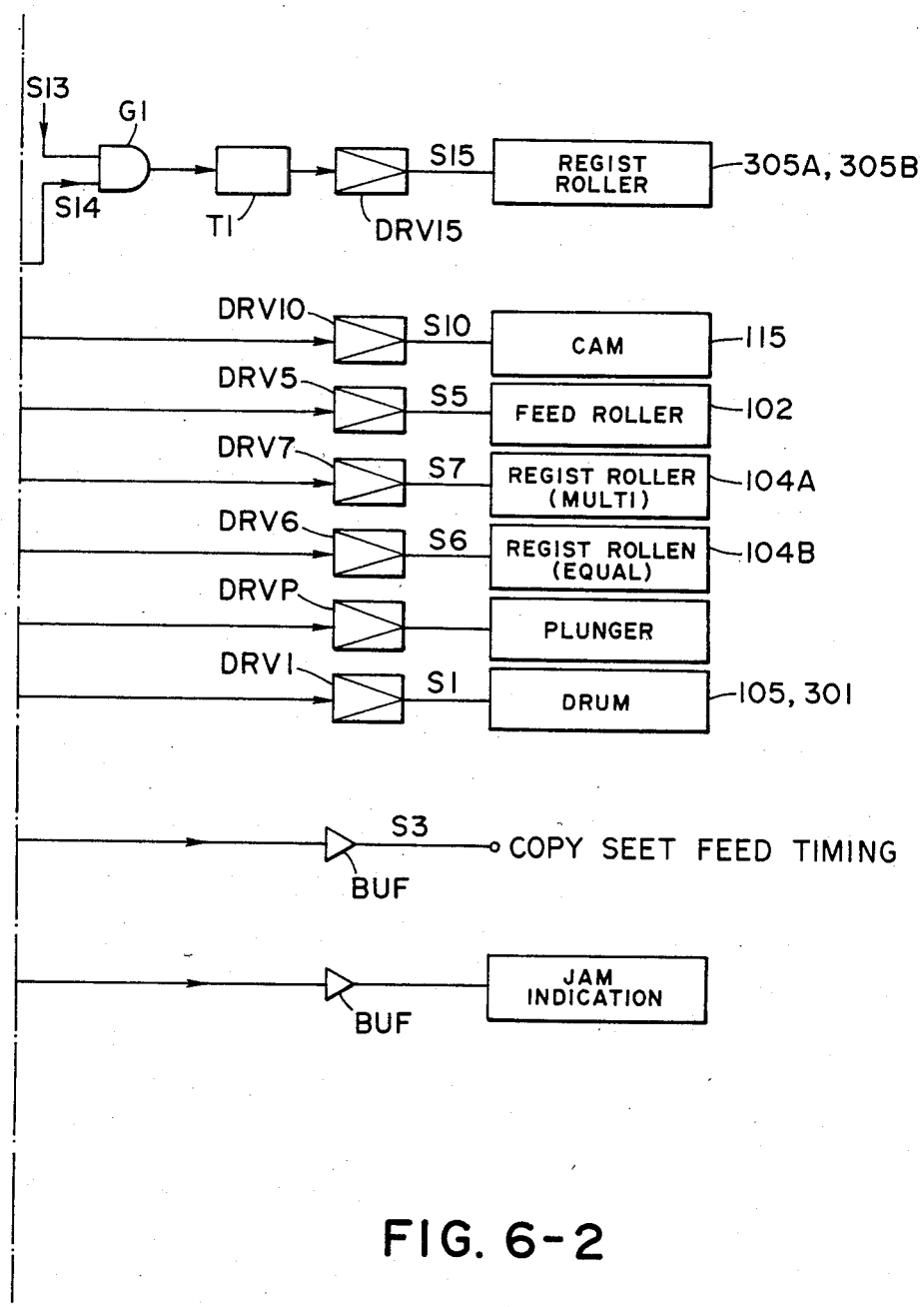
Figures 1, 7:
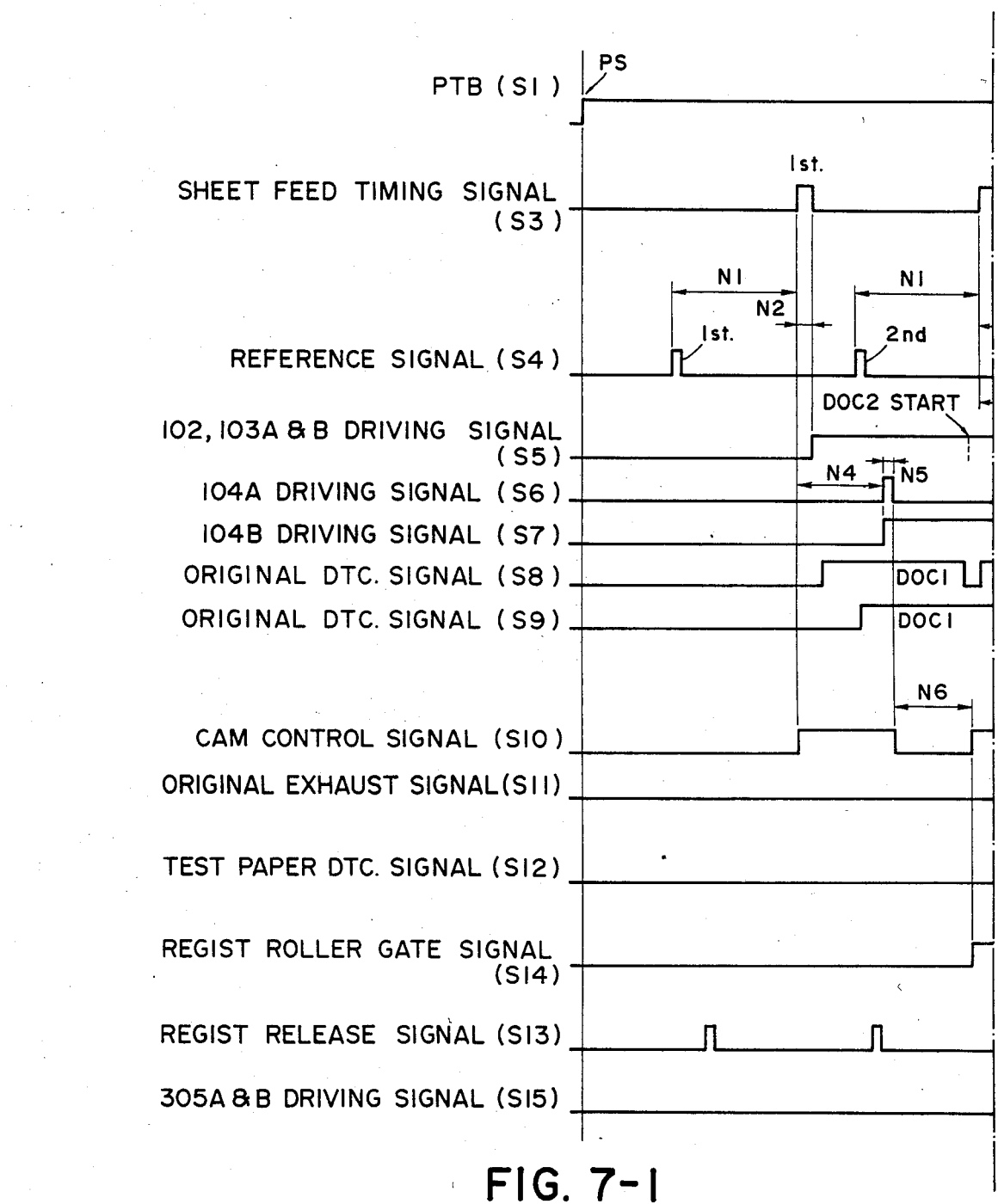
Figures 2, 7:
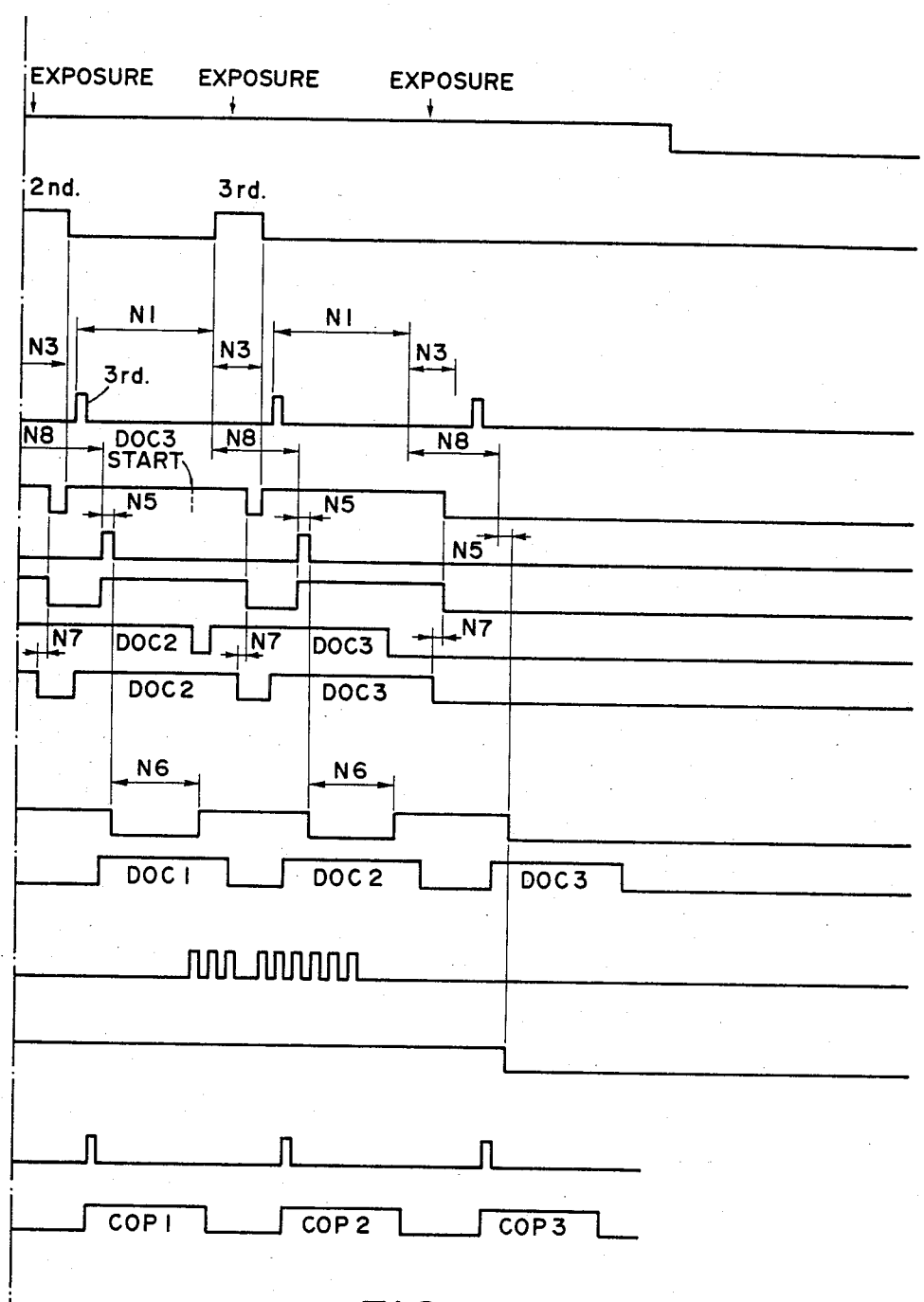
Figures 1, 8:
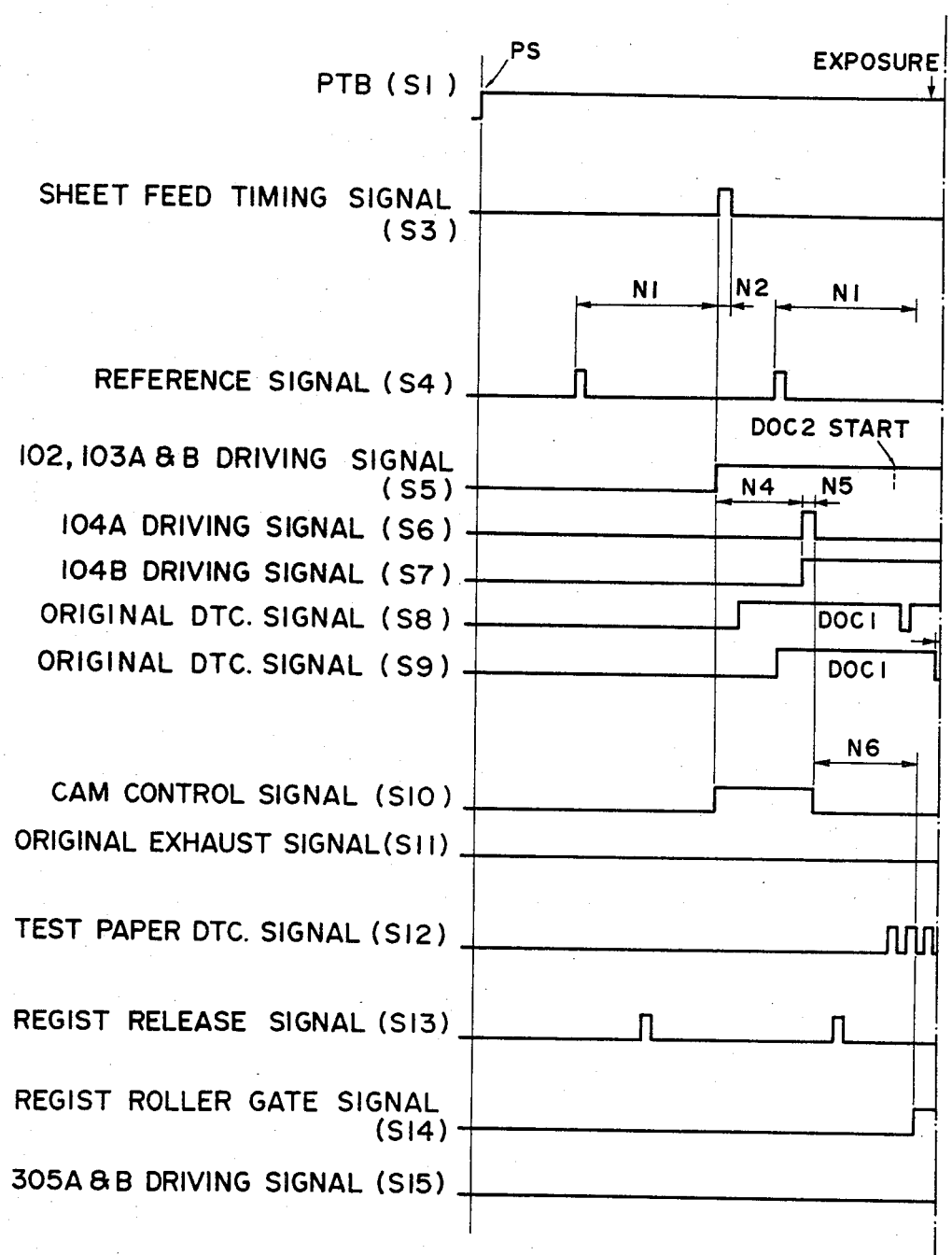
Figures 2, 8:
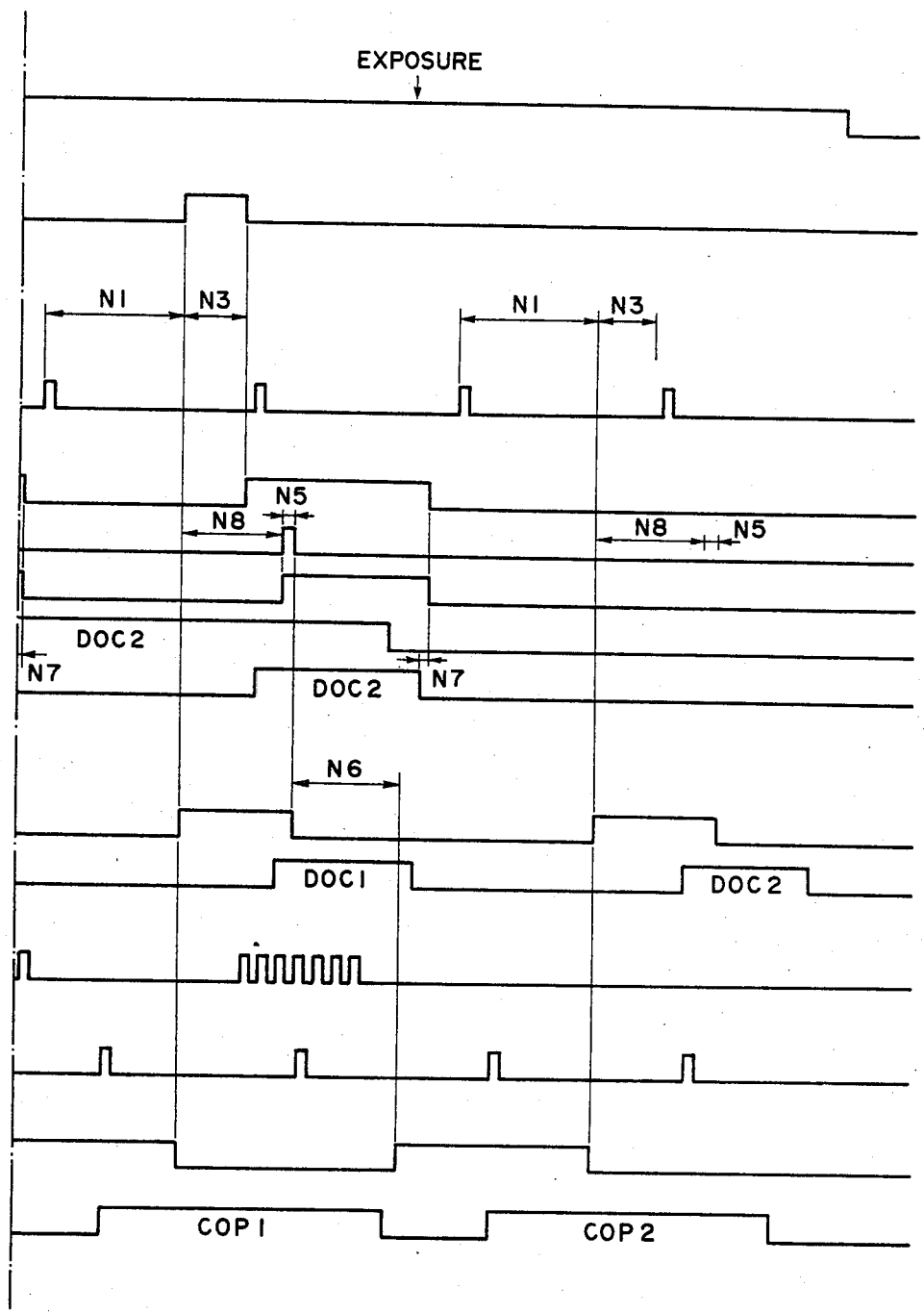

During the copying operation of the A4 size original, the signal S8 rises while the period of time N6 is counted. Then, the flow of operation follows YES and the trailing end passage flag is generated in step T108. Since the trailing end passage flag is not generated in the case of copying the A3 size original, the program advances to the flow indicated by G in FIG. 9E. The CPU controls the respective units according to the timing charts shown in FIG. 10 and the copying operation is executed. Immediately before the signal S8 falls, the second original DOC2 is fed to the register rollers 104A and 104B by the rollers 102, 103A and 103B. The original DOC2 is the last original and it rotates the disk 117 so that the last paper detection signal S12 rises. After the elapse of the period of time N6, the register roller gate signal S14 falls for a predetermined period of time (step T109 In step T110, the presence or absence of the trailing end passage flag is confirmed. The program advances to step T111 and waits until the signal S9 falls. At the trailing edge of the signal S9, that is, when the trailing end of the first DOC1 passes between the detectors 112A and 112B, the counter CNT7 is energized (step T112). After the elapse of the period of time N7, the signals S5 and S7 fall (step T113).

The feed roller 102, the separation rollers 103A and 103B, and the register rollers 104A and 104B then stop, and the second original DOC2 stops before its leading end reaches the detectors 112A and 112B. The original holding drum 105 continues to rotate while the original DOC2 stays motionless. In response to the leading edge of the third pulse of the reference signal S4, the counter CNT1 is energized (step T114) to start counting the period of time N1. When the register release signal S13 rises while the register roller gate signal S14 is at high level, the AND gate G1 outputs a signal of high level to the timer T1. The timer T1 then feeds out the register roller drive signal S15 for a period of time corresponding to the A3 size copy sheet. Then, the copy sheet COP1 registered by the register rollers 305A and 305B is fed to the photosensitive drum 301.

When the period of time N1 is counted, the second pulse of the copy sheet feed timing signal S3 is generated (step T115), and the counters CNT3 and CNT8 are energized (step T116). The register roller gate signal S14 rises, and the cam control signal S10 falls (steps T117 and T118). In response to the signal S3, the second copy sheet COP2 is fed toward the register rollers 305A and 305B from the sheet feed section 304A and is registered by the register rollers 305A and 305B. The gripper 114 and the cam 115 oppose each other in response to the leading edge of the cam control signal S10 When the gripper 114 rotates to contact with the cam 115, the gripper 114 clamping the original DOC1 opens, and the separation lever 145 presses the original DOC1 upward, so that the original DOC1 is separated from the drum 105.

Figures 1, 9A:
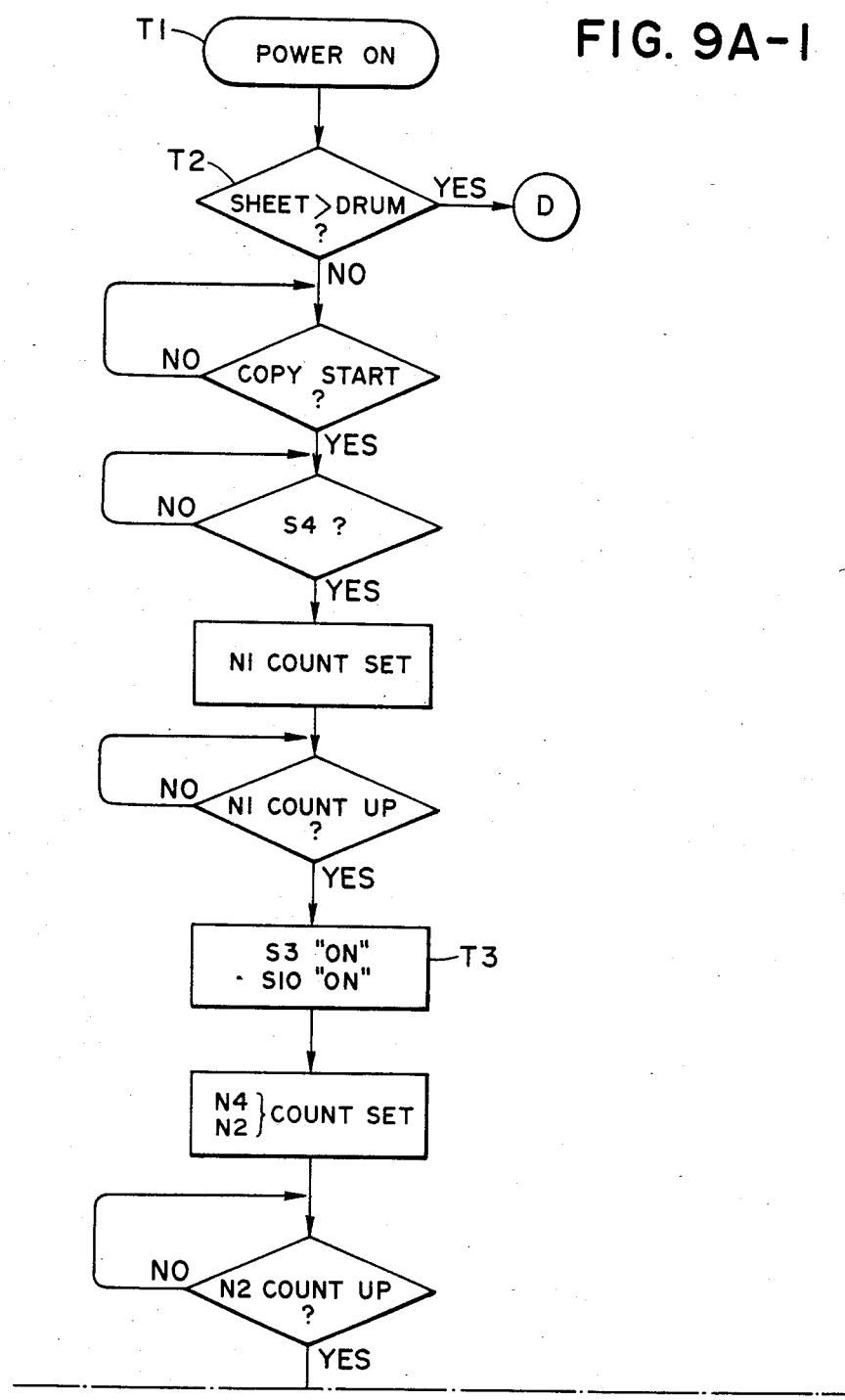
Figures 2, 9A:
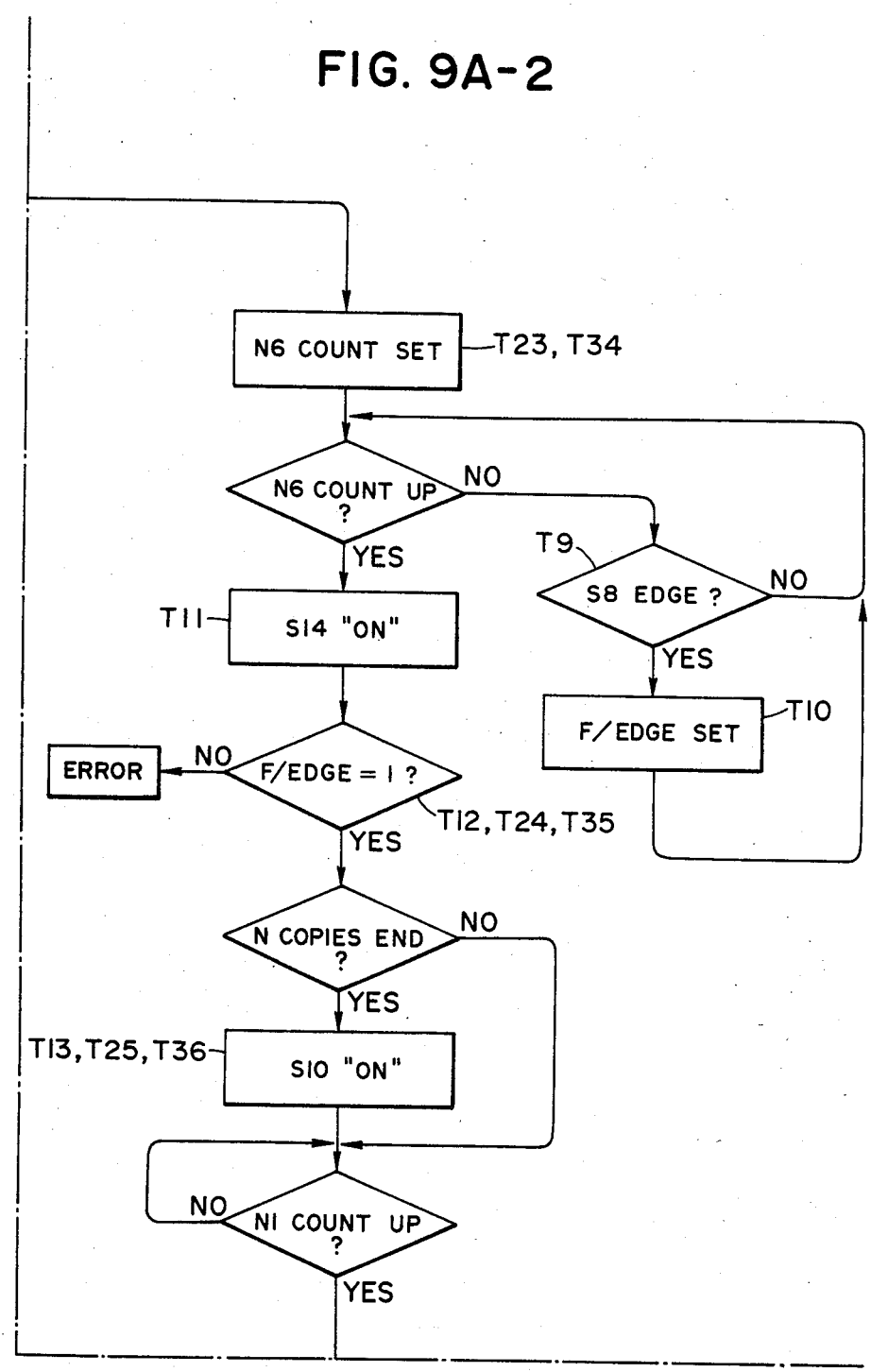
Figures 3, 9A:
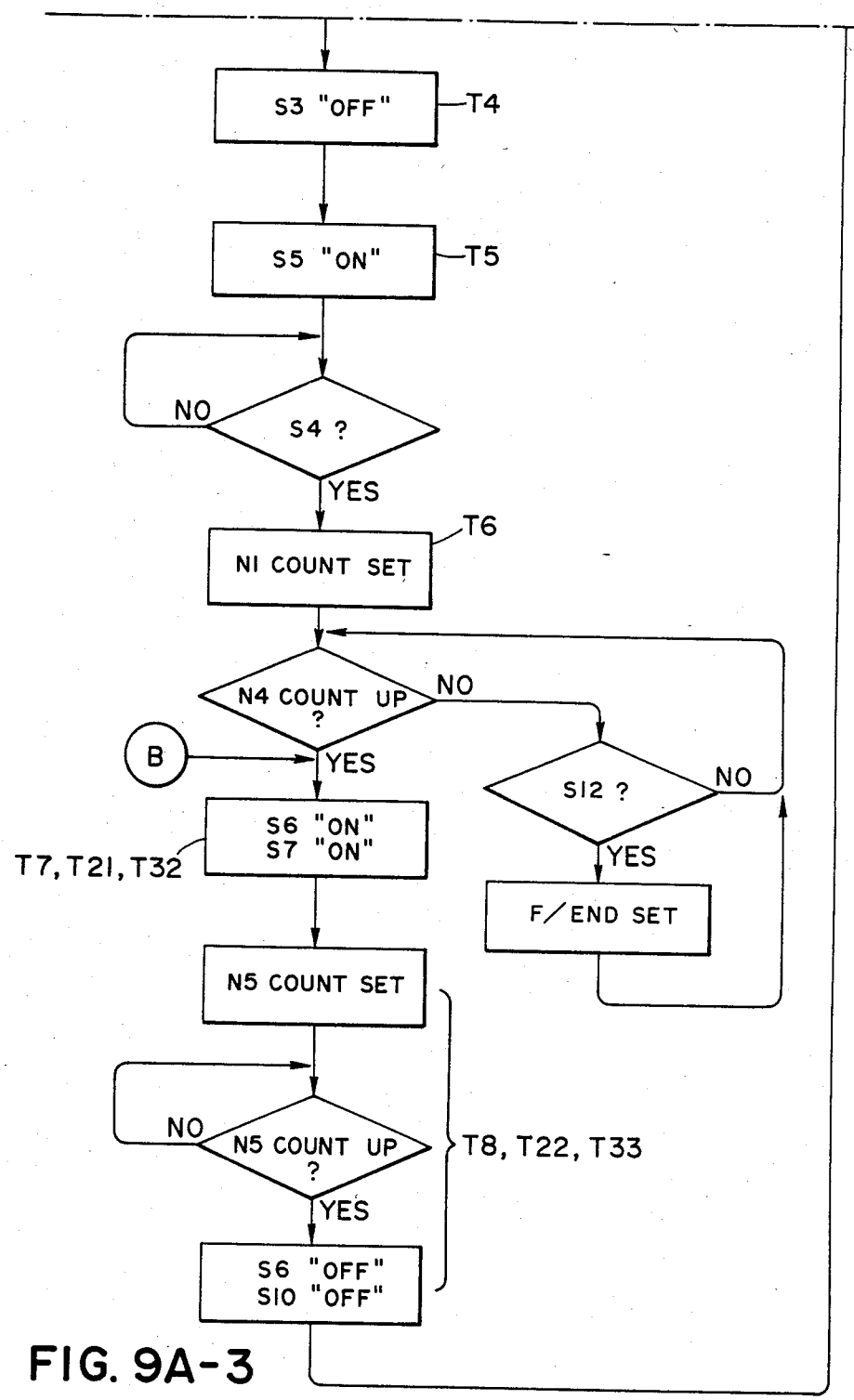
Figures 4, 9A:
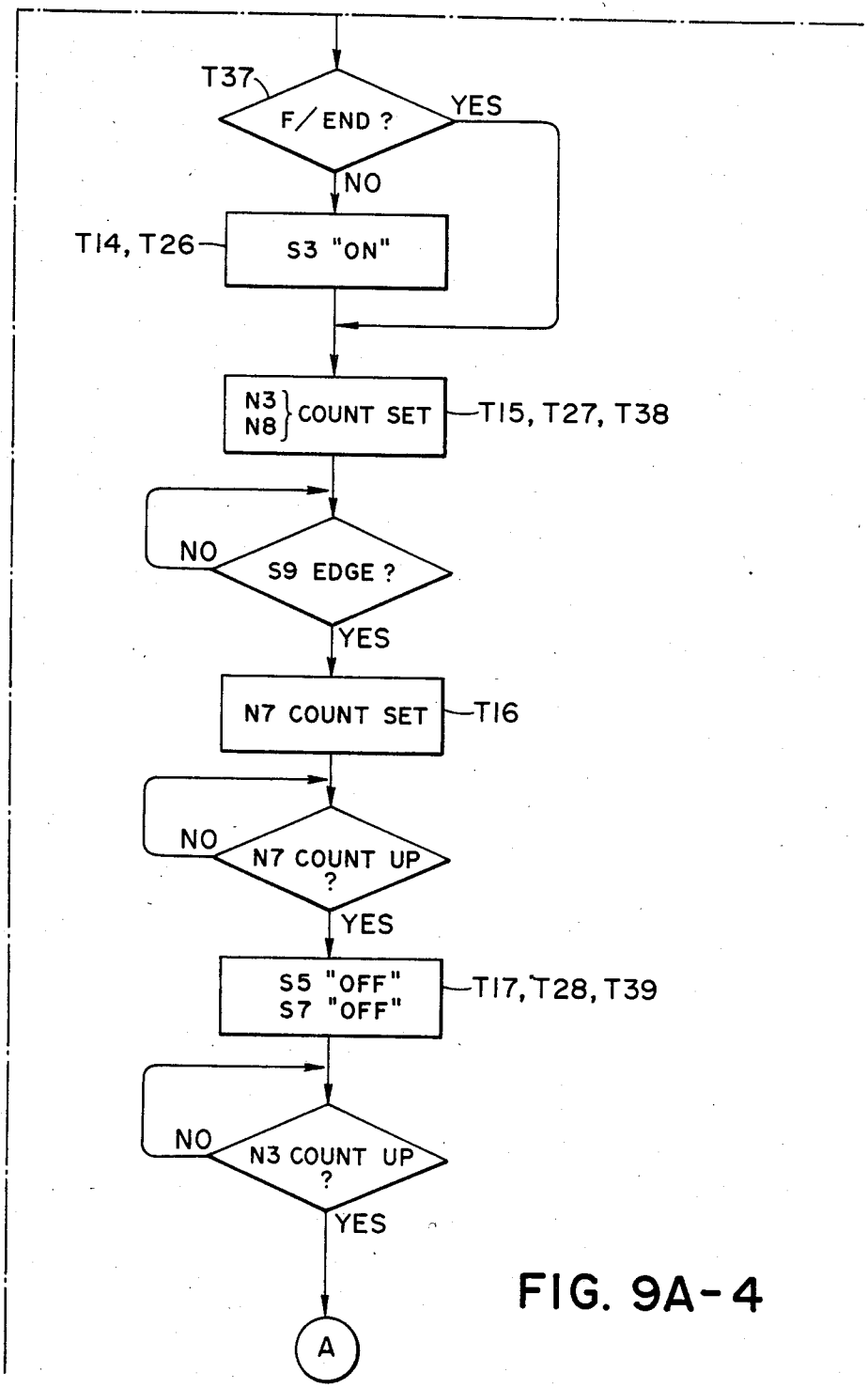
Figure 9B:
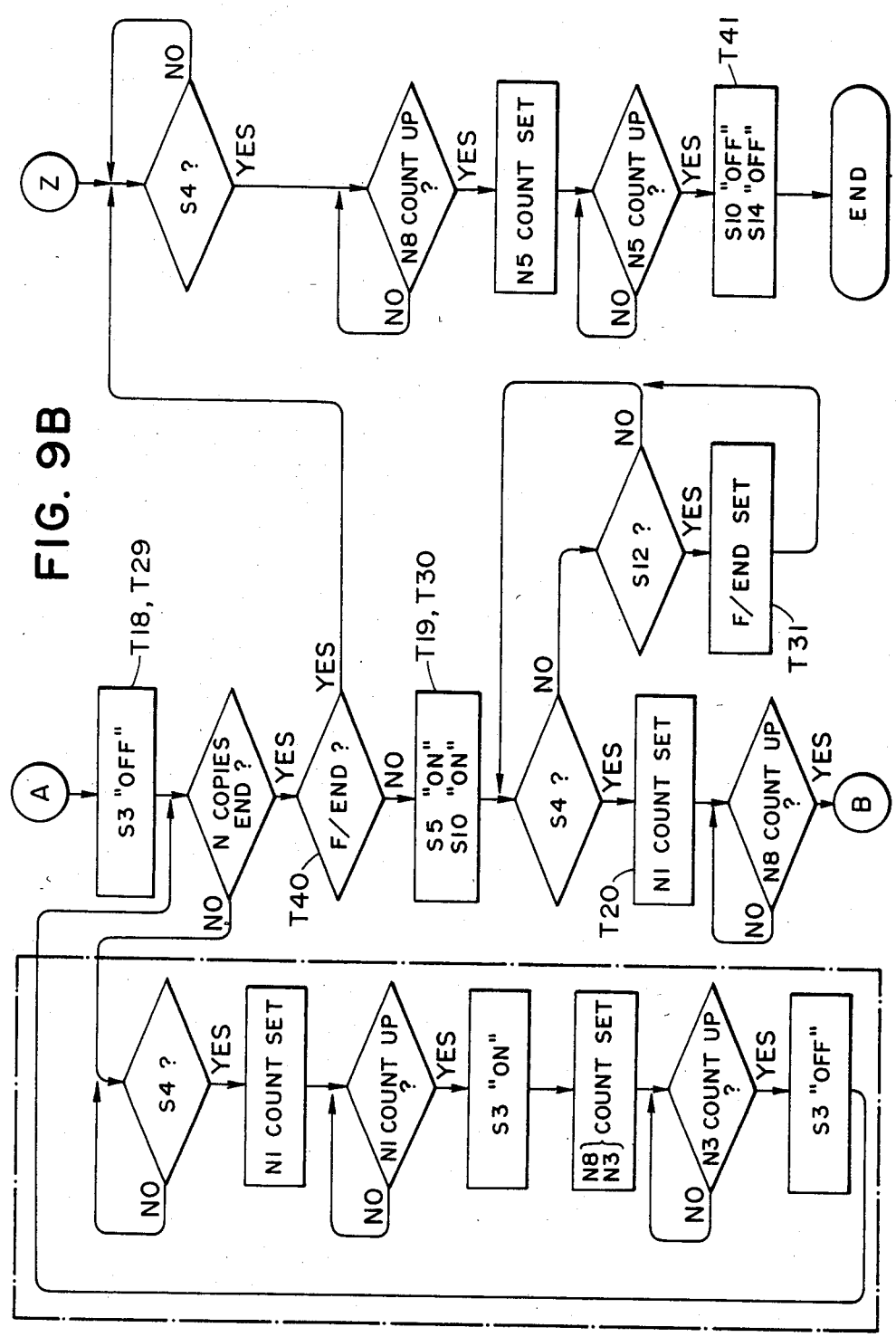
Figures 1, 9C:
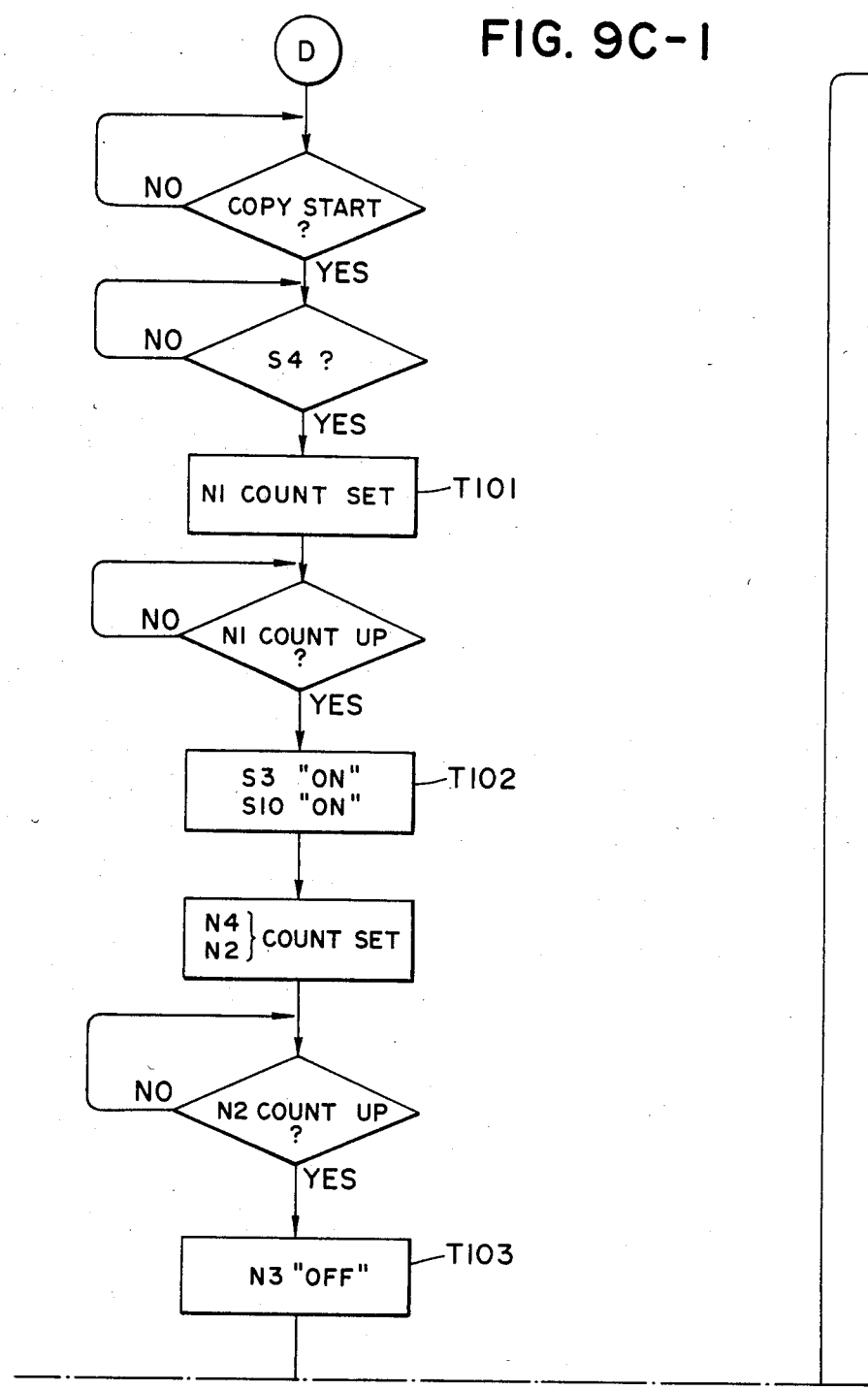
Figures 2, 9C:
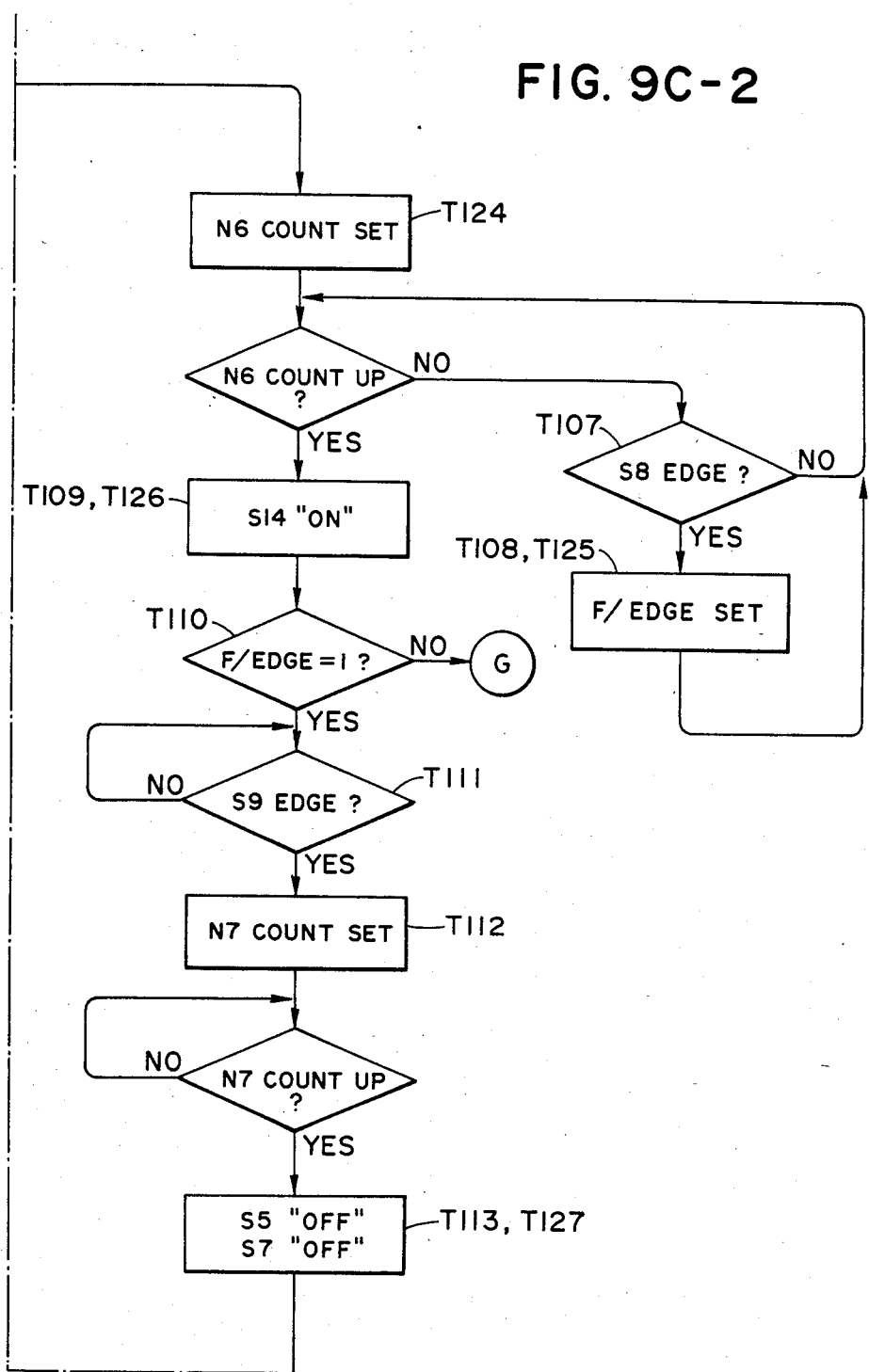
Figures 3, 9C:
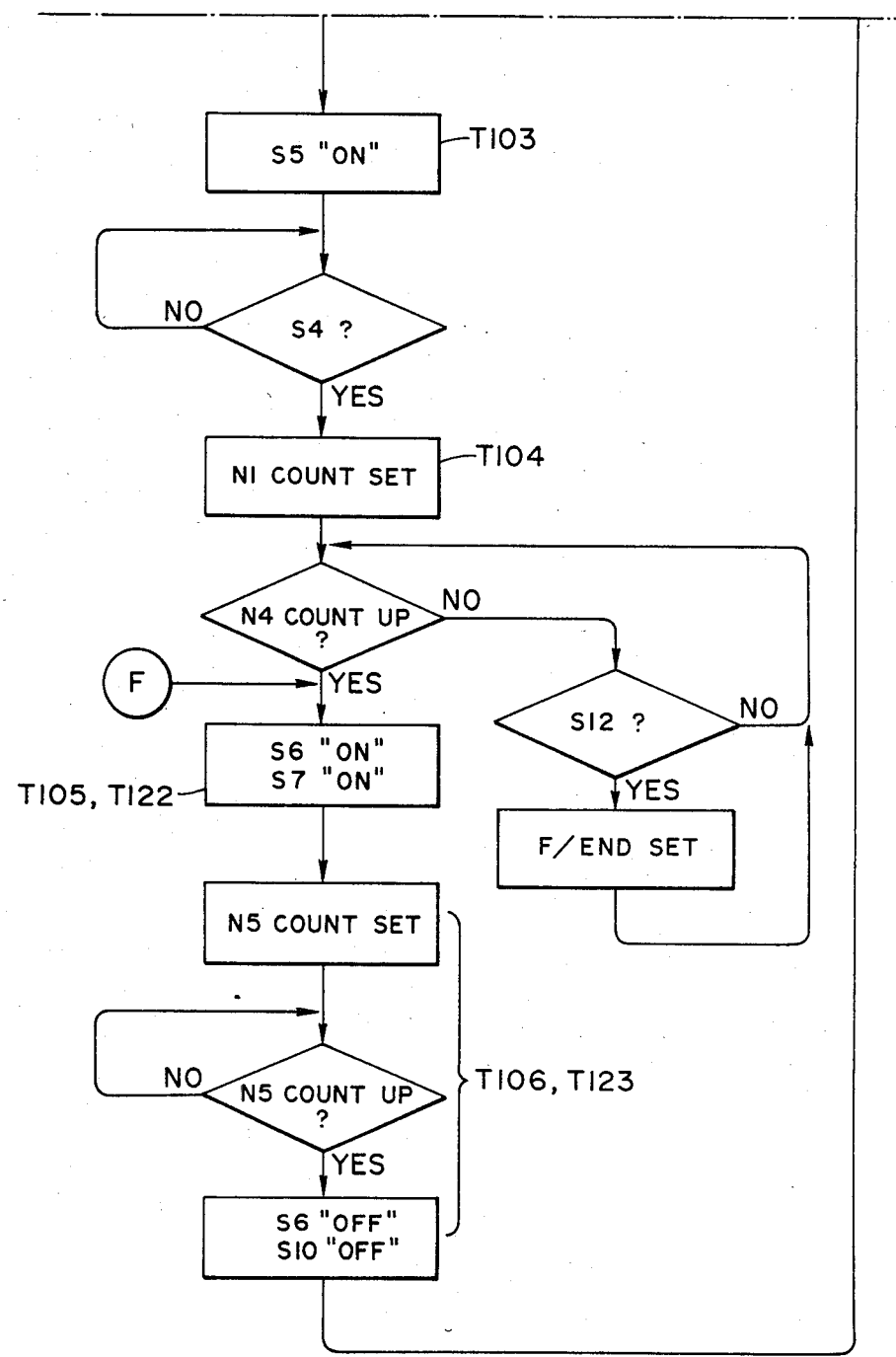
Figures 4, 9C:
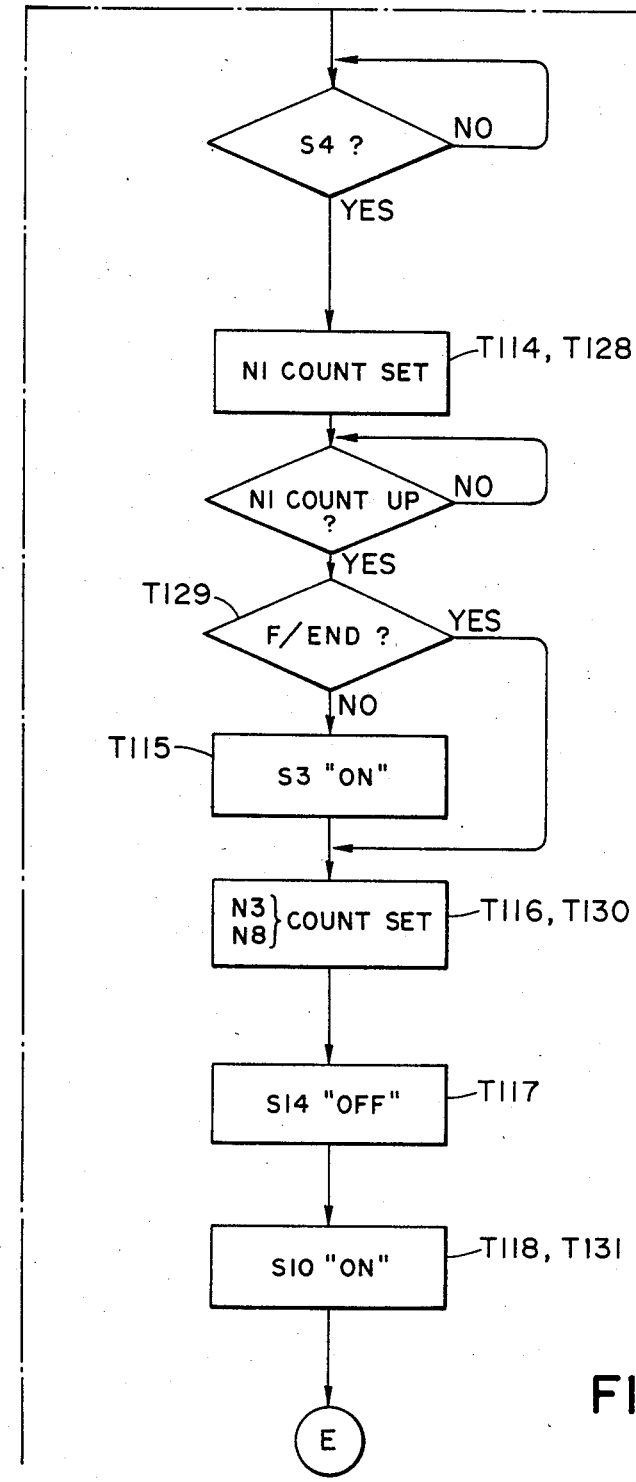
Figure 9D:
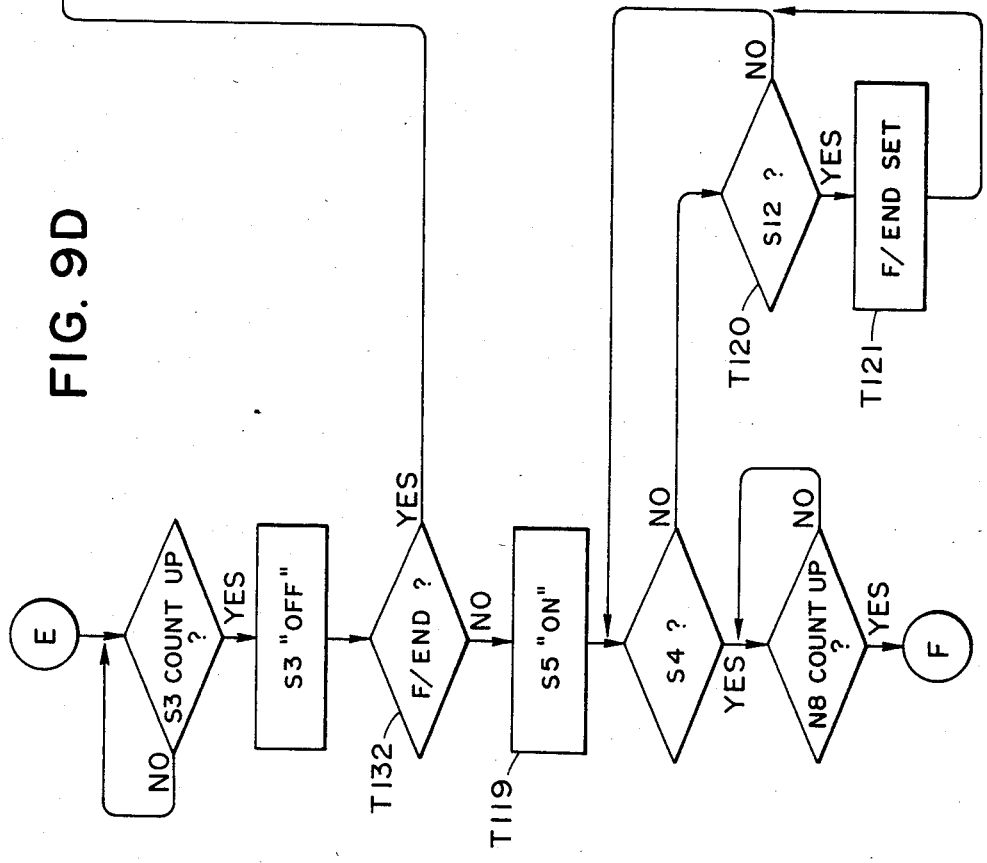
Figure 9E:
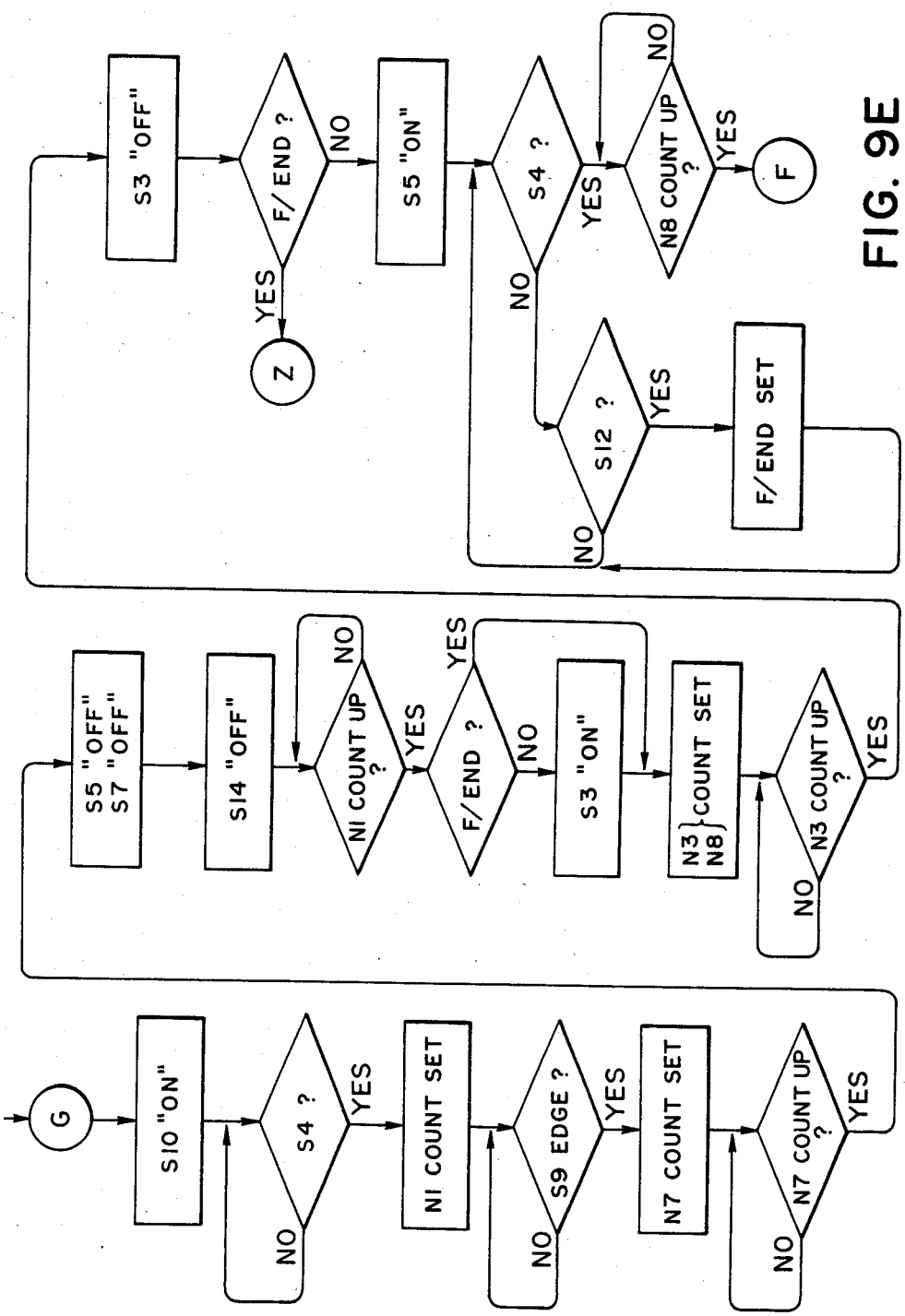
Figures 1, 10:
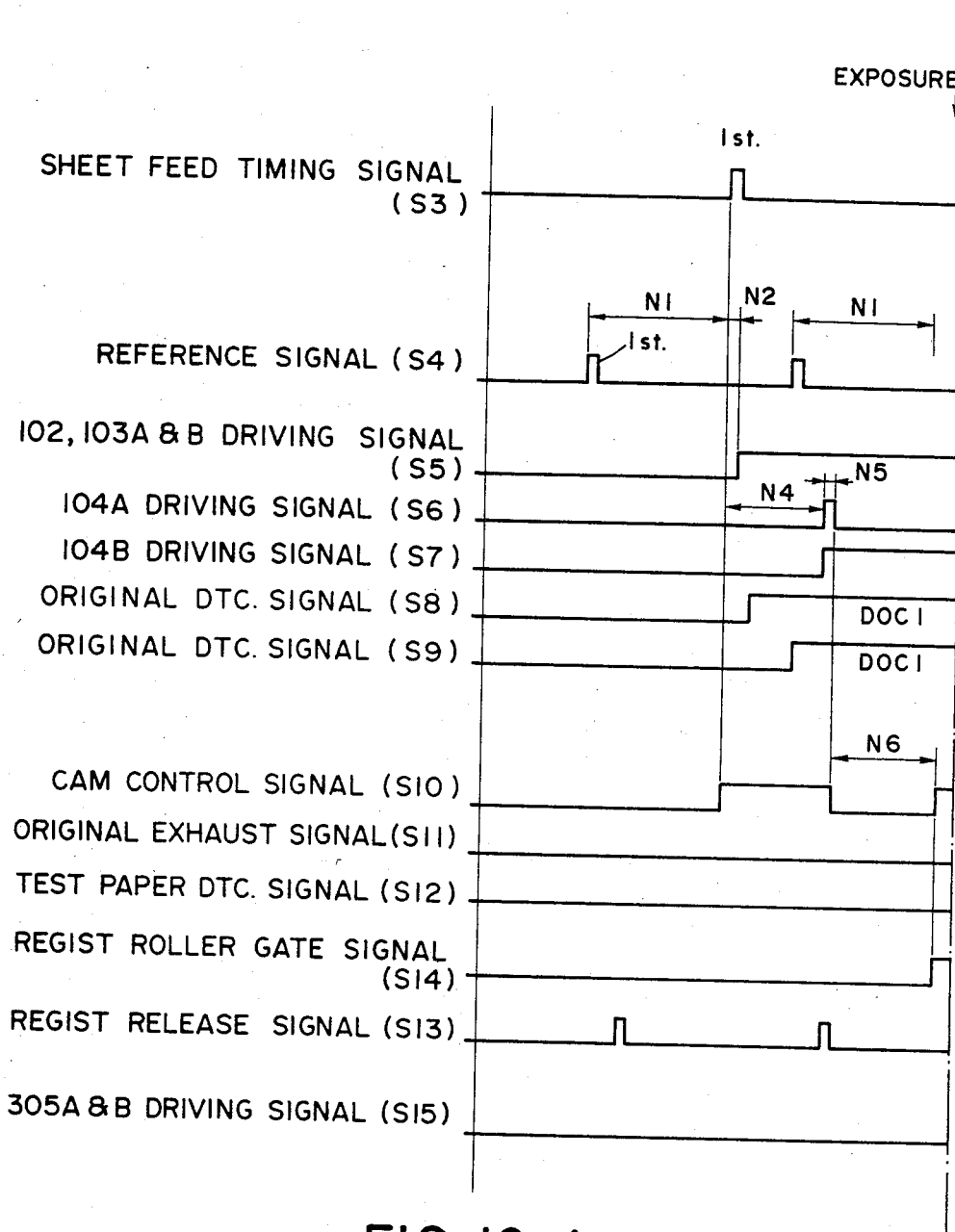
Figures 2, 10:
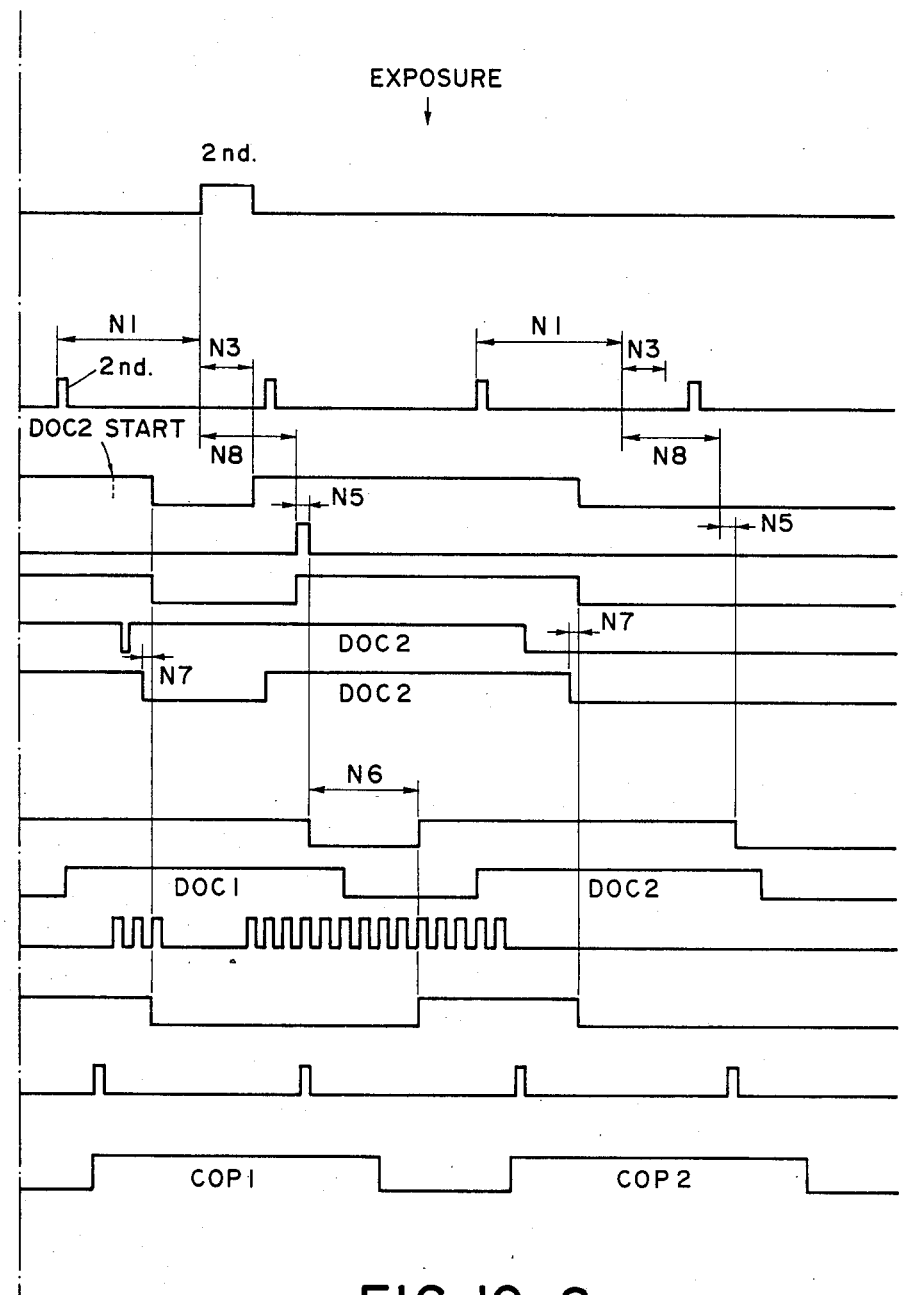

Referring to FIG. 9D, when the counter CNT3 counts the period of time N3, the signal S3 falls and the feed roller drive signal S5 is generated (step T119 in FIG. 9D) to feed again the original DOC2 which has been stopped. While counting the period of time N8, it is discriminated if the last paper detection signal S12 is generated (step T120) after the fourth pulse of the reference signal S4 rises. Since the signal S12 is already at the peak, the end flag is generated in step T121. When the period of time N8 is counted next, the signals S6 and S7 are generated (step T122 in FIG. 9C) to convey the original DOC2 at the speed 2V to the gripper 114 for the period of time N6. After the original DOC2 is clamped by the gripper 114, the original DOC2 is rotated by the drum 105 at the speed V.

When the period of time N5 is counted, the signals S6 and S10 fall (step T123) and the counter CNT6 is energized (step T124). While the period of time N6 is counted, the trailing end passage flag is generated (step T125) in response to the trailing edge of the signal S8. When the period of time N6 is counted, the signal S14 rises (step T126). After the period of time N7 elapses from the trailing edge of the signal S9, the signals S5 and S7 fall (step T127) to stop the rollers 102, 103A, 103B, 104A, and 104B. In response to the leading edge of the fifth pulse of the reference signal S4, the period of time N1 is counted (step T128). In response to the register release signal S13 which is generated when the register roller gate signal S14 is at high level, the timer T1 is energized, and the copy sheet COP2 registered by the register rollers 305A and 305B is fed to the photosensitive drum 301. When the period of time N1 elapses, it is discriminated in step T129 that the end flag is generated to energize the counters CNT3 and CNT8 without generating the signal S3 (step T130). At the same time, the signal S14 falls, and the cam control signal S10 is generated (step T131) to remove the original DOC2 from the drum 105. When the period of time N3 is counted, it is discriminated in step T132 that the end flag is generated. When the period of time N8 is counted, the period of time N5 begins to be counted. When the period of time N5 begins to be counted, the signal S10 falls (step T131) to complete the flow of operation according to this embodiment.

According to this embodiment, for copying the information of an A4 size original on an A4 size copy sheet, one copying operation is performed upon each complete revolution of the original holding drum. For copying the information of an A4 size original on an A3 size copy sheet, one copying operation is performed upon two complete revolutions of the original holding drum. In this manner, the information of an original which is shorter than the circumference of the original holding drum can be copied on a copy sheet which is longer than the circumference of the original holding drum. Furthermore, according to this embodiment, after the print button is depressed, the size of the copy sheet is discriminated, and the copying operation is then performed according to the flow of operation corresponding to the size of the copy sheet. Next, within a predetermined period of time after the original is held on the original holding drum, the trailing end of the original is detected by the sensors arranged at the predetermined positions of the ADF to discriminate if the original is of A4 or A3 size. Based on the discrimination result obtained, the ADF and the copier are operated according to the size of the original. Therefore, the copying operation may be performed according to the sizes of the original and the copy sheet without requiring special operation on the side of the operator.

Referring to FIG. 9B, the flow indicated by the alternate long and short dashed line is for copying one original on a plurality of copy sheets.

In this manner, since the feeding of the copy sheet is initiated according to the reference signal which is generated every time the original holding drum completes one revolution, the registering of the original with the copy sheet may be performed with ease.

After the copy sheet is fed toward the photosensitive drum in synchronism with the rotation of the original holding drum, the copy sheet is temporarily registered. This registering operation is released in synchronism with the rotation of the original holding drum. Therefore, the copy sheet may be fed to the photosensitive drum at a suitable timing, and the registering of the original with the copy sheet may be accomplished without failure.

After detecting the size of the original and the copy sheet, the ADF and the copier are operated according to the detected sizes. Therefore, even if the circumference of the original holding drum is shorter than the maximum length of the original which may be copied, the information of originals of various sizes may be copied on copy sheets of various sizes. A copying machine with an ADF may thus be made compact in size and reliable.

When copying an original on a copy sheet in a reduced scale with such a copying machine with an automatic document feeder, a need sometimes arises for copying in different scales. In this case, the rotational frequencies of the original holding drum and the photosensitive drum are different. If the control of the ADF and the copying machine is based on the clock signals obtained in association with one of these drums, the feeding timings of the original and the copy sheet may deviate from each other, or the control timings of the respective units of the copying machine may deviate from each other.

Control for copying in a reduced scale will now be described. In the embodiment of the present invention, the respective units of the copying machine and the respective control timings of the ADF 100 and the copier 300 are controlled based upon the clock signals supplied from the drum clock generator CLD. Therefore, the control timings deviate from the ideal timings in the case of a copying operation in a different scale. The deviation in the control timings is prevented in the manner to be described below.

Figure 11:
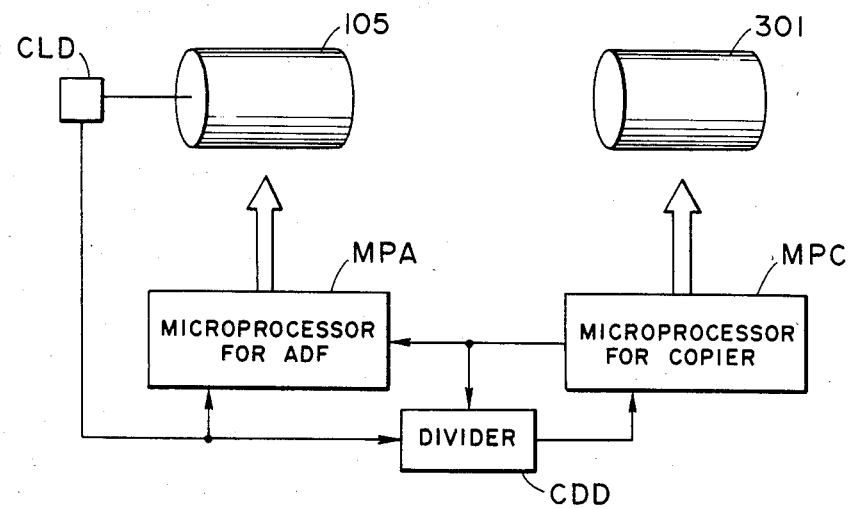
FIG. 11 is a block diagram showing an example of a control section of an automatic document feeder and a copying machine.

FIG. 11 shows an example of a control unit for the ADF and the copier according to the present invention, which includes a microprocessor MPA for the ADF and a microprocessor MPC for the copier. The microprocessor MPA controls the timings such as the timing of feeding the original in the ADF, while the microprocessor MPC controls the chargers 309 to 311, the developing unit 302, the transfer unit 303, and so on. The clock signal from the drum clock generator CLD is directly supplied to the microprocessor MPA; it is also supplied to the microprocessor MPC through a frequency divider CDD. In correspondence with the copying operation in different scales, in two reduced scales in the case of this embodiment, the frequency divider CDD frequency-divides the clock signal supplied from the drum clock generator CLD and supplies the obtained signal to the microprocessor MPC. Whether or not the clock signal is frequency-divided, or into what time components it is divided, is controlled by a reduction ratio signal RS supplied from the microprocessor MPC to the frequency divider CDD in response to depression of a reduction ratio selection button (not shown) mounted on the copier 300. The reduction ratio signal RS is also supplied to the microprocessor MPA to control the rotational frequency of the drum 105 of the ADF. In this manner, according to the present invention, the ratio of frequency division by the frequency divider CDD is increased in correspondence with an increase in the rotational frequency of the drum 105 of the ADF.

As for the control in the case of copying in a reduced scale, the timings of feeding the original or the copy sheet are controlled in a similar manner as in the case of the control in equal size as described above. The initiating timings of the respective steps and the driving operation of the respective units are controlled according to the clock signals frequency-divided by the frequency divider CDD and the timing signals supplied from the side of the ADF 100. Therefore, in the copier 300 of the present invention, the microprocessor MPA for the ADF and the microprocessor MPC for the copier may be controlled by the clock signals obtained from a single clock generator. A clock generator may be mounted to the photosensitive drum 301. In this case, the clock signal whose period is shortened according to the reduction ratio is supplied to the microprocessor MPA for the ADF.

In this manner, the respective units of the automatic document feeder and the copier may be controlled, for copying operation in equal size or in difference scales, based on the clock signals obtained from a clock signal generator which is mounted to either the original holding drum of the automatic document feeder or the photosensitive drum of the copier.

Figure 12:
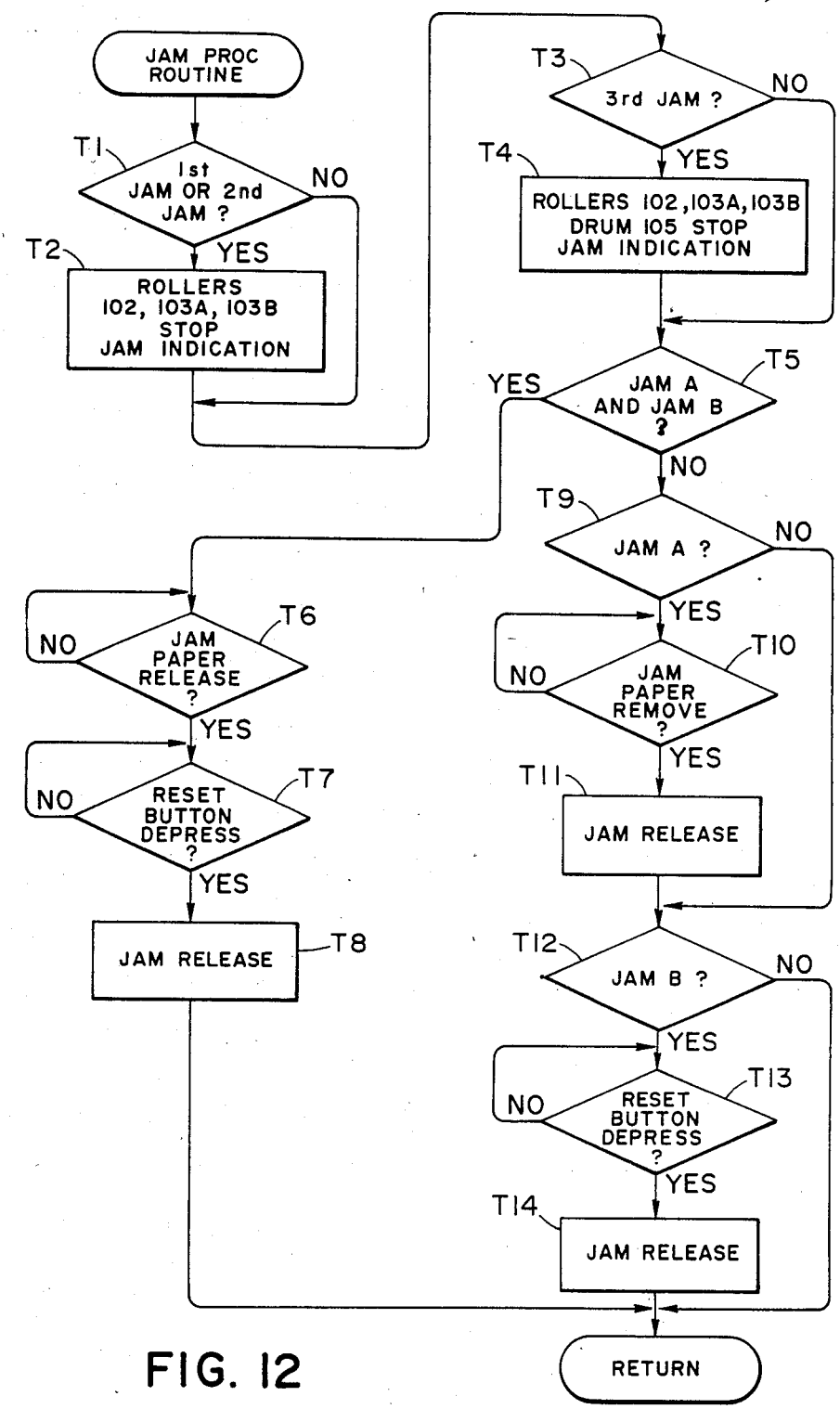
FIG. 12 is a flow chart showing an example of a jamming processing system.

In the automatic document feeder, paper jams are detected according to a jam processing routine as shown in FIG. 12. Jamming of the original may be classified into three categories (including defective conveyance which might result in jamming or a slanted orientation of the original). Jamming of a first category (to be referred to as first jam hereinafter) refers to the case wherein the original is slanted as it is fed to the register rollers 104A and 104B. Jamming of a second category (to be referred to as second jam hereinafter) refers to the case wherein the original which is fed from the register rollers 104A and 104B is not clamped by the gripper 114. Jamming of the third category (to be referred to as third jam hereinafter) refers to the case wherein the original exposed to light as held on the drum 105 is not separated from the drum 105 in the normal manner. In the case of the first jam, the jammed sheet can be pulled from the side of the feed roller 102; this jamming of the first category will be referred to as jam A hereinafter. In the cases of second or third jam, the original is jammed inside the ADF. Therefore, the original cannot be removed unless the ADF is opened. The jamming of the second or third categories will be referred to as jam B hereinafter.

Figure 13:
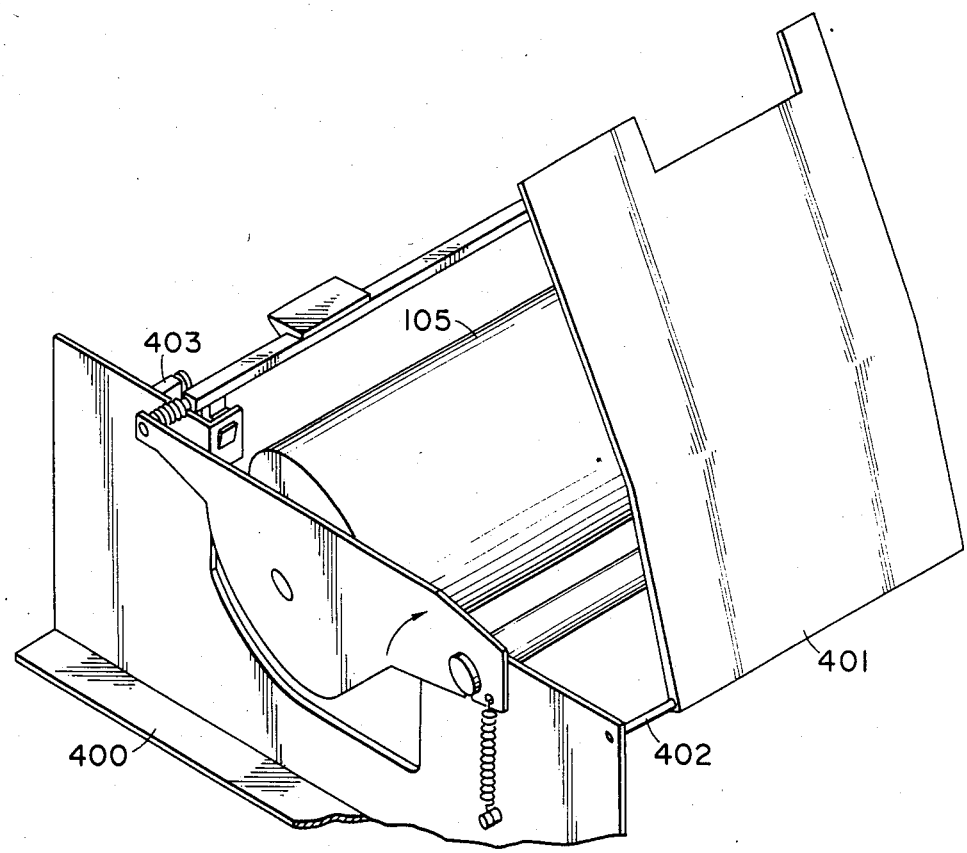
FIG. 13 is a partial, enlarged view of the automatic document feeder according to the present invention.

FIG. 13 is a partial, enlarged view of the ADF for explaining the procedure for removing the jammed sheet in the case of jam B. Two side plates 400 are fixed to the copier in opposition to each other (only one side plate is shown in FIG. 13 for the sake of simplicity). A cover 401 covers the original holding drum 105 and so on, and is axially supported by a pin 402 which is fixed to the side plates 400. When the jam B is indicated and the jammed sheet is to be removed, the cover 401 is pivoted upward about the pin 402 and the jammed sheet is removed. Then, after depressing a reset button 403 as an interruption release means of the automatic document feeder, the cover 401 is closed. The ADF then starts operating and the copying operation may then be resumed.

The jam processing routine will now be described in more detail with reference to FIG. 12.

When the original being fed to the register rollers 104A and 104B by the feed roller 102 and the separation rollers 103A and 103B is slanted, the pairs of ramp sensors 111C and 111D arranged at the positions corresponding to the side edges of the original do not detect the ends of the original DOC at the same time, thereby detecting the slanted orientation of the original DOC and discriminating the first jam (step T1 in FIG. 12 ). Signals are supplied to the central processing unit CPU to indicate jamming (step T2). When the gripper 114 fails to clamp the original, the original does not move along the drum 105 but enters a path 120. The grip failure sensor 119 detects this and discriminates the second jam (step T1). Then, jamming due to grip failure is indicated and the rollers 102, 103A and 103B are stopped (step T2).

If the original is not separated from the drum 105 in the normal manner even when the exposed original is released from the gripper 114, the sheet feed sensors 113A and 113B detect a delay of arrival of the original and discriminate the third jam (step T3). Then, in response to a control signal from the central processing unit CPU (step T3), jamming as an interruption release means of the automatic document feeder, the cover 401 is closed. The ADF then starts operating and the copying operation may then be resumed.

The jam processing routine will now be described in more detail with reference to FIG. 12.

When the original being fed to the register rollers 104A and 104B by the feed roller 102 and the separation rollers 103A and 103B is slanted, the pairs of ramp sensors 111C and 111D arranged at the positions corresponding to the side edges of the original do not detect the ends of the original DOC at the same time, thereby detecting the slanted orientation of the original DOC and discriminating the first jam (step T1 in FIG. 12 ). Signals are supplied to the central processing unit CPU to indicate jamming (step T2). When the gripper 114 fails to clamp the original, the original does not move along the drum 105 but enters a path 120. The grip failure sensor 119 detects this and discriminates the second jam (step T1). Then, jamming due to grip failure is indicated and the rollers 102, 103A and 103B are stopped (step T2).

If the original is not separated from the drum 105 in the normal manner even when the exposed original is released from the gripper 114, the sheet feed sensors 113A and 113B detect a delay of arrival of the original and discriminate the third jam (step T3). Then, in response to a control signal from the central processing unit CPU (step T3), jamming is indicated, and the rotation of the rollers 102, 103A and 103B and the drum 105 and all the other operations are interrupted (step T4).

The steps (to be referred to as the jamming release steps hereinafter) for resuming the operation of the ADF which has been interrupted in this manner will now be described.

It is discriminated in step T5 if the jamming is of jam A or jam B type. If the discrimination result is YES, the jammed sheet is pulled from the feed roller 102 in the case of jam A (step T6), and the jammed sheet is removed by opening the cover 401 shown in FIG. 13 in the case of jam B (step T6). When the cover 401 is closed (step T8) after the reset button 403 is depressed, the jamming is released (step T8). If, on the other hand, the discrimination result obtained in step T5 is NO, it is first discriminated in step T9 if the jamming is of jam A type. If the discrimination result is YES, the jammed sheet is removed (step T10) to release the jamming (step T11). If the jam B alone is generated, it is discriminated in step T12 that the jamming is of jam B type. After the jammed sheet is removed, the reset button 403 is depressed (step T13) to release the jamming. The discrimination of whether or not the jammed sheet is removed in step T10 may easily be made by checking if the sensors 111C and 111D detect the original DOC.

The above operation is not limited to the case of jam processing in the ADF, but may be performed to freely interrupt the operation of the ADF with slight changes. If it is desired to interrupt the operation of the ADF before the original is clamped by the gripper 114, the rollers 102, 103A and 103B are interrupted to remove the original. On the other hand, if it is desired to interrupt the ADF after the original is held on the drum 105, the operation of the ADF and all the other units are interrupted and the original is exhausted. In this manner, the original may be safely handled. The jamming processing as in the third jam is also performed when the third jam occurs during the exhaust step described above.

In this manner, since the occurrence of jamming is detected in advance, and the respective units of the ADF are interrupted according to the position of the jammed sheet, damage to the original may be prevented without failure.

The jam processing differs according to the position at which the jamming occurs. Furthermore, the ADF does not resume its operation until the jammed original is removed and/or the reset button is depressed after the jammed sheet is removed, so that the original may be safely handled.

What I claim is:

1. A copying machine having an automatic document feeder comprising:

movement and feed out means for moving and feeding out an original to be scanned, said means moving the original circulatively in one direction;

image forming means for forming an image on a recording material according to the original at a selectable magnification;

feeding means for feeding the recording material to said image forming means; and control means for controlling the operation of said feeding means in accordance with a timing signal which is varied according to the selected magnification and for causing a moving velocity of the original moved by said movement and feed out means and an image forming velocity of said image forming means to vary relatively to each other in accordance with the selected mangification.

2. A copying machine according to claim 1, further comprising means for generating said timing signal signal based on operation of said movement and feed out means, wherein said control means controls said feeding means in accordance with the timing signal.

3. A copying machine according to claim 2, wherein said timing signal generating means has different signal generation sections corresponding to the respective magnification.

4. A copying machine according to claim 1, wherein said control means controls a timing at which the recording material is fed from a recording material housing section.

5. A copying machine according to claim 1, wherein said feeding means has registering means, an operation timing of which is controlled by said controlling means.

6. A copying machine according to claim 1, wherein said movement and feed out means includes circulating means for circulating the original, and further comprising means for generating said timing signal upon each revolution of said circulating means.

7. A copying machine according to claim 1, wherein said circulating means comprises a drum.

8. A copying machine having an automatic document feeder comprising:

movement and feed out means for moving and feeding out an original to be scanned;

detecting means for detecting a trailing edge of the original fed out by said movement and feedout means;

image forming means for forming an image on a recording material according to the original at a selectible magnification;

feeding means for feeding the recording material to said image forming means: and control means for controlling said movement and feedout means so as to feed the original with greater feeding intervals, if the size of the recording material is larger than a predetermined size, in comparison with the instance wherein the size of the recording material is smaller than a Predetermined size; wherein said movement and feedout means feeds a successive original in response to an original trailing edge detection output from said detecting means.

9. A copying machine according to claim 8, wherein said movement and feedout means is adapted to move the original circulatively in one direction.

10. A copying machine according to claim 8, wherein a moving velocity of the original moved by said movement and feedout means and an image forming velocity of said image forming means are variable relative to each other.

11. A copying machine according to claim 8, wherein said movement and feedout means includes means for accommodating a plurality of originals, means for feeding out the originals from said accommodating means, and timing means for providing a predetermined timing for the feeding out of originals wherein successive originals are fed out from said accommodating means through said movement and feedout means in response to original trailing edge detection outputs from said detecting means.

12. A copying machine according to claim 11, wherein said control means controls an operation of said timing means in accordance with the size of the recording material.

13. A copying machine having an automatic document feeder comprising:

movement and feedout means for moving and feeding out an original to be scanned, and being operable in a first exposure mode wherein the original is circulatively moved in one direction and in a second exposure mode wherein the original is not moved in a circulative direction;

image forming means for forming an image on a recording material according to the original at a selectible magnification;

feeding means for feeding the recording material to said image forming means; and selecting means for selecting the first exposure mode or the second exposure mode in accordance with the size of the original.

14. A copying machine according to claim 13, wherein said selecting means includes detecting means for detecting the size of the original fed out by said feeding means, and selects the first exposure mode or the second exposure mode in accordance with an output of said detecting means.

15. A copying machine according to claim 13, wherein said feeding means includes a drum for holding the original, and wherein in the first exposure mode the original is circulatively moved while it is held by said drum, and in the second exposure mode the original is moved without being held by said drum.

* * * * *

UNITED STATES PATENT AND TRADEMARK OFFICE
CERTIFICATE OF CORRECTION

PATENT NO. : 4,563,082

DATED : January 7, 1986

INVENTOR(S) : YUKIO SATO

It is certified that error appears in the above-identified patent and that said Letters Patent is hereby corrected as shown below:

FIG. 6-1

Sheet 6 of 26, "GLIP FAILAR SESOR" should read --GLIP FAILURE SENSOR--.

FIG. 6-2

Sheet 7 of 26, "REGIST ROLLEN (EQUAL)" should read --REGIST ROLLER (EQUAL)--.
    "COPY SEET FEED" should read --COPY SHEET FEED--.

COLUMN 1

Line 66, "descrimination" should read --discrimination--.

COLUMN 2

Line 38, "combination timing" should read --combination, timing--.

COLUMN 3

Line 1, "to a an" should read --to as an--

COLUMN 6

Line 43, "A time T1" should read --A timer T1--.

UNITED STATES PATENT AND TRADEMARK OFFICE
CERTIFICATE OF CORRECTION

PATENT NO. : 4,563,082

DATED : January 7, 1986

INVENTOR(S) : YUKIO SATO

It is certified that error appears in the above-identified patent and that said Letters Patent is hereby corrected as shown below:

COLUMN 7

Line 49, "T6). Even" should read --T6) even--.

COLUMN 10

Line 47, "detectrs" should read --detectors--.

COLUMN 11

Line 64, "T109 In" should read --T109). In--

COLUMN 12

Line 30, "S10 When" should read --S10. When--.

COLUMN 15

Line 67, delete "as an interruption release".
    Line 68, delete in its entirety.

COLUMN 16

Lines 1-26, delete in their entirety.
    Line 27, delete "unit CPU (step T3), jamming"

COLUMN 17

Lines 31 and 32, "timing signal sig-nal" should read --timing signal--.

UNITED STATES PATENT AND TRADEMARK OFFICE
CERTIFICATE OF CORRECTION

PATENT NO. : 4,563,082

DATED : January 7, 1986

INVENTOR(S) : YUKIO SATO

It is certified that error appears in the above-identified patent and that said Letters Patent is hereby corrected as shown below:

COLUMN 18

Line 8, "Predetermined" should read --predetermined--.

Signed and Sealed this

Fourteenth Day of October, 1986

[SEAL]

Attest:

DONALD J. QUIGG

Attesting Officer

Commissioner of Patents and Trademarks